(12) United States Patent
Vostrikov et al.

(10) Patent No.: US 6,663,984 B2
(45) Date of Patent: Dec. 16, 2003

(54) CLAD STEEL ROLLED SECTION FOR REINFORCING CONCRETE AND METHOD OF PRODUCTION

(75) Inventors: Vasily Petrovich Vostrikov, Chelyabinsk (RU); Konstantin Igorevich Gramotnev, Moscow (RU); Vyacheslav Nikolaevich Chernyshev, Moscow (RU); Aleksei Valerievich Sadovsky, Moscow (RU); Petr Vasilievich Vostrikov, Chelyabinsk (RU)

(73) Assignee: Zakrytoe Aktsionerone Obschestvo "Transkom", Moscow (RU)

( * ) Notice: Subject to any disclaimer, the term of this patent is extended or adjusted under 35 U.S.C. 154(b) by 28 days.

(21) Appl. No.: 10/114,513

(22) Filed: Apr. 2, 2002

(65) Prior Publication Data

US 2003/0064245 A1 Apr. 3, 2003

(30) Foreign Application Priority Data

Jul. 10, 2001 (RU) .......................... 2001119136

(51) Int. Cl.[7] .............................. B32B 15/18; B23P 17/04
(52) U.S. Cl. ................... 428/685; 29/897.34; 52/740.1; 52/740.2; 148/527; 148/595; 428/682
(58) Field of Search ............... 428/685, 682; 52/740.1, 740.2; 29/897.34; 148/527, 595

(56) References Cited

FOREIGN PATENT DOCUMENTS

RU        2155134        8/2000

Primary Examiner—Robert R. Koehler
(74) Attorney, Agent, or Firm—Ladas & Parry

(57) ABSTRACT

Clad steel roiled section suitable for reinforcing concrete is disclosed, which is produced from a bimetallic ingot comprising a basic material containing a group of alloy elements including Si and Al, and a surface layer of a ferritic or austenitic stainless steel containing a group of alloy elements including Cr and Ni, by hot rolling the ingot to an intermediate billet and a rolled section, and subjecting the rolled section to heat treatment. A feature of the reinforcing clad steel rolled products is that the basic material is steel containing, in percent by weight, from 1.0 to 5.0 Si and from 0.1 to 5.0 Al, with the proviso that $3.0 \leq (Si+Al) \leq 6.0$. The reinforcing clad rolled products exhibit superior mechanical strength and impact toughness, improved corrosion resistance and high bond strength between the layers and with concrete. The clad rolled products are produced by a method involving making a bimetallic bar with a stainless steel surface layer, hot rolling the bar in several passes by calibrated rolls, the final rolling being effected by calibrated rolls with corrugated surface observing the relationship:

$$\frac{H_0}{\psi \cdot d} \leq 1$$

where $H_o$ is the maximum depth (height) of corrugations on the roll surface, d is the bar diameter, $\psi$ is the relative thickness of the stainless layer.

9 Claims, 14 Drawing Sheets

1 – Surface layer; 2 – Diffusion layer; 3 – Basic layer

1 – Surface corrosion-resistant layer; 2 – Diffusion layer.

CLAD STEEL ROLLED SECTION FOR REINFORCING CONCRETE AND METHOD OF PRODUCTION

BACKGROUND OF THE INVENTION

The present invention relates to ferrous metallurgy and more specifically to clad steel rolled section used to reinforce concrete and a method for producing the same.

Known in the prior art is a method for producing clad steel sheets comprising a basic metal layer made of steel containing, in percent by weight: $\leq 1.0$ C; from 0.05 to 1.0 Si; from 0.3 to 2.5 Mn, and a clad layer containing Ni+Cr$\leq 10.0$; one or two from the elements: $\leq 2.0$ Cu; $\leq 1.0$ Mo; $\leq 0.1$ SD; $\leq 0.1$ V; the balance being Fe and minor impurities. The bimetallic clad pack is connected across the edges by welding or by other means, and hot rolled after pre-heating and heat treatment. The composite sheet is heated before rolling to a temperature above 1150° C. and held at this temperature (JP, 61-294223, 21.06.88, B 23 K 20/04) [1].

Also known in the prior art is a clad steel rolled section comprising a main steel layer, intermediate layer and surface stainless steel layer, and a method for producing the same. The layers contain a group of alloy elements including Si and Cr, in percent by weight: from 1.5 to 7.0 Si, up to 3.0 Cr, Si/Cr $\geq 0.5$ in the basic layer; from 0.5 to 7.0 Si, from 2 to 14 Cr, Si/Cr $(8.5/Cr-0.5)\pm 0.2$ in the intermediate layer, and up to 6.5 Si, from 6.0 to 25.0 Cr, Si/Cr$\leq 0.4$ in the surface layer.

The method for producing the clad steel rolled section comprises the steps of making a bimetallic billet, hot rolling the billet in several passes, and subjecting the billet to thermo-mechanical treatment. (RU, 2155134 Cl, 27.08.2000, B 32 B 15/18) [2].

Most closely approaching the present invention is a method for producing clad steel sheets, wherein a basic strip is made of steel containing, in percent by weight: $\leq 0.05$ C, from 0.05 to 0.8 Si, from 0.8 to 2.2 Mn, from 0.02 to 0.08 Al, the balance iron, and a clad layer is made of highly corrosion-resistant steel. The strips, united in a pack, are rolled to a predetermined thickness and heat treated, being held at a temperature of 900–1150° C. for more than 10 seconds and then cooled with the rate more than 0.5° C. per second (JP, 58-150377, 08.03.85, C 21 D 9/52) [3].

Basic problems with the prior art technical solutions include inadequate strength and impact toughness of the produced clad articles, insufficient corrosion resistance, and inferior bond strength between the layers and with concrete.

The object of the present invention is to overcome the above problems and provide a clad steel rolled section used to reinforce concrete, which would exhibit superior mechanical strength and impact toughness, improved corrosion resistance and high-strength bond between the layers and with concrete.

SUMMARY OF THE INVENTION

The object of the invention is attained by a clad steel rolled section for reinforcing concrete, produced from a bimetallic ingot comprising a basic material, such as steel containing, in percent by weight, from 1.0 to 5.8 Si and from 0.1 to 5.0 Al, with the proviso that $3.0 \leq (Si+Al) \leq 6.0$, and a surface layer of ferritic or austenitic stainless steel containing a group of alloy elements including Cr and Ni, by hot rolling the ingot to an intermediate billet and then to a rolled section, and subjecting the rolled section to heat treatment.

The basic and surface layers preferably comprise one or more components selected from the group including: manganese, molybdenum, tungsten, vanadium, copper, titanium, niobium, zirconium, yttrium, rare-earth metals (REM), nitrogen and carbon, in percent by weight, in the basic layer: up to 3.0 nickel; up to 3.0 chromium; up to 3.0 manganese; up to 1.0 molybdenum; up to 0.5 tungsten; up to 0.7 vanadium; up to 0.5 copper; up to 0.3 titanium; up to 0.5 niobium; up to 0.5 zirconium; up to 0.2 yttrium; up to 0.2 REM; up to 0.5 nitrogen; up to 0.8 carbon; the balance being iron and impurities, and in the surface layer: up to 34 nickel; up to 25 chromium; up to 6.5 silicon; up to 4.0 aluminium; up to 6.0 manganese; up to 6.1 molybdenum; up to 4.0 tungsten; up to 0.5 vanadium; up to 5.0 copper; up to 1.2 titanium; up to 1.0 niobium; up to 1.0 zirconium; up to 0.5 yttrium; up to 0.5 REM; up to 0.8 nitrogen, up to 0.5 carbon, the balance being iron and impurities.

The surface layer having a relative thickness of up to 20% in the cross-section of the billet is preferably made of a stainless steel with ferritic structure containing, in percent by weight: $\leq 3.0$ Ni and from 10 to 25 Cr, the basic layer contains Si and Al in the ratio Si/Al$\geq (1+$Ni/Cr$)$, and a diffusion layer between said layers contains the main alloy components in the ratio:

$$\{(Fe)_{1-x-y}(Si,Al)_x Cr_y\}, \text{ where } x+y \leq 18.$$

The surface layer having a relative thickness of up to 20% in the cross-section of the billet is preferably made of a stainless steel with austenitic structure containing, in percent by weight: from 4 to 34 Ni and from 6 to 25 Cr, the basic layer contains Si and Al in the ratio Si/Al$\geq (2-$Ni/Cr$)$, and a diffusion layer between said layers contains the main alloy components in the ratio:

$$\{(Fe,Ni)_{1-x-y}(Si,Al)_x Cr_y\}, \text{ where } x+y \leq 18.$$

The object of the invention is also attained in a method for producing a clad steel rolled section for reinforcing concrete, in accordance with the invention comprising the steps of: making a bimetallic bar with a surface layer of a stainless steel having austenitic or ferritic structure; hot rolling in several passes through calibrated rolls, the final rolling being carried out by calibrated rolls with a corrugated surface observing the following relationship:

$$\frac{H_0}{\psi \cdot d} \leq 1$$

where $H_o$ is the maximum depth (height) of corrugations on the roll surface, d is the bar diameter, $\psi$ is the relative thickness of the surface layer.

The above object is also attained in a method for producing a clad steel rolled section for reinforcing concrete, comprising the steps of: making a bimetallic strip with a surface layer of a stainless steel having austenitic or ferritic structure; hot rolling in several passes by rolls with a plain body, the final rolling being carried out by rolls with a corrugated surface observing the relationship:

$$0.2 \leq \frac{h_1}{\psi \cdot h_0} \leq 1$$

where $h_1$ is the maximum depth (height) of corrugations on the roll surface, $h_o$ is the thickness of the bimetallic strip, $\psi$ is the relative thickness of the surface layer.

The bimetallic strip is preferably rolled or press formed at a temperature no greater than 1150° K to a half-tube section with surface curvature 1/D and wall thickness $h_o$ within the relationship:

$$5 \cdot \frac{h_0}{D} \leq 1.$$

DETAILED DESCRIPTION OF THE INVENTION

It is well known that mechanical properties of clad steel rolled products substantially depend on the strength of the basic material. Under optimal conditions, where the content of Si and Al in the basic layer is within the range defined in claim 1, specifically, in percent by weight: from 1.0 to 5.8 Si and from 0.1 to 5.0 Al, with the proviso that $3.0 \leq (Si+Al) \leq 6.0$), mechanical strength is from 550 to 1300 MPa, and impact toughness is from 1.1 to 3.1 $MJ/m^2$. The clad-to-basic layer bond strength can be considerably improved by disintegration of solid solution Fe—Si—Al—Cr—Ni and formation of new phase $\{(Fe, Ni)_{1-x-y}(Si,Al)_x Cr_y\}$ with coherent inter-phase boundaries in the diffusion region. In this case the bond strength can be equal to the basic layer strength or even exceed it, this permitting the production of a bimetallic rolled section with entire corrosion-proof surface, e.g. in the shape of a round or square billet with stainless cladding closed over the entire perimeter. The bimetallic billet may be further deformed to a round or square section or to a strip without cladding discontinuities over the entire perimeter, including the end faces of the rolled strip (with edge uncut), and retain corrosion prevention over the entire surface (FIGS. 1 and 2).

If in the produced clad steel rolled products Si and Al content is beyond the upper limit indicated in claim 1, e.g. 6.1 Si and 5.1 Al in percent by weight, mechanical strength decreases to less than 550 NPa at room temperature, and impact toughness decreases to less than 0.9 $MJ/m^2$. This is caused by the reduction in strength and plastic parameters of solid solution Fe—Si—Al due to generation of superstructures, such as $Fe_{13}Si_3$, $Fe_3Si$ and $Fe_7Al$. The properties of such level fail to meet the requirements imposed upon reinforcing sections.

If Si and Al content is beyond the lower limit, e.g. 0.9 Si and 0.05 Al in percent by weight, mechanical strength of the basic material and inter-layer bond strength decrease to less than 500 MPa and 0.6 $MJ/m^2$, respectively. This is caused by insufficient content of Si and Al in solid iron solution, which enhance strengthening the structure and reduction of iron oxides at the interface between layers. The diffusion boundary which is formed during heating and hot rolling comprises a great amount of oxide films, discontinuities and other structural defects, and deformation often leads to stratification and fractures in the clad layer.

Going beyond the lower limit of the (Si+Al) content in the basic material of the obtained clad rolled products, e.g. at the value of 2.9, leads to mechanical strength reduction below the permissible limit of 500 mPa, while exceeding the upper limit, e.g. at the value of 6.1, leads to impact toughness reduction to less than 1.0 $MJ/m^3$. The aforementioned mechanical properties depend on the level of strengthening the solid solution structure by silicon and aluminium, and the optimal choice of the martensitic transformation temperature range. The rolled products have optimal properties when (Si+Al) content is within the range from 3 to 6 percent by weight (FIG. 3).

During heat treatment of a bimetallic ingot, a diffusion layer is formed in the transition zone between the surface layer and the basic layer, the diffusion layer consisting from FE-based solid solution and alloyed with the main components, such as Si, Al, Cr and Ni, and other components contained in the basic and surface layers, part of which is present in the ingot as impurities (FIGS. 4,5). The diffusion layer is formed as the result of mutual diffusion of the above components, their effect on structural transformations in the diffusion layer being different, e.g. Si, Cr and Al stabilize ferrite, Ni in the amount of up to 3% dissolves in ferrite and in a greater amount stabilizes austenitic areas in the structure. Cr and Ni reduce the martensitic transformation temperature. Si insignificantly increases and Al drastically increases the martensitic transformation temperature. In combination, the processes affect the diffusion layer microstructure formation and, as consequence, the surface/basic layer bond strength.

Another circumstance of significant importance is that the basic layer ferritic structure, which is well stabilized with Si and Al, has a restricted solubility in terms of C content (less than 0.1%), therefore, the remained carbon in the process of heat treatment of bimetallic rolled products is displaced partially to carbide phase and partially to intermediate zone between the layers. As the result, a relatively thin diffusion layer may be enriched in carbon to a significant extent (up to 1% and more), which may precipitate, under unfavorable conditions, as numerous lines of isolated carbide particles over the inter-phase boundaries and grain boundaries, this impairing the surface-to-basic layer bond strength.

The listed alloy components, including nickel, chromium, manganese, molybdenum, tungsten, vanadium, copper, titanium, niobium, zirconium, yttrium, rare-earth metals (REM), nitrogen and carbon may have different purposes in the surface and basic layer. By way of example, Ni and Cr in the surface layer define the structure type and corrosion resistance of the surface. When Ni content is less than 3% and Cr content is from 10 to 25%, the steel has ferritic structure and its surface exhibits high resistance to atmosphere corrosion. At a content from 4 to 34% Ni and from 6 to 25% Cr, the steel structure may be either austenitic/ferritic (duplex) or austenitic, and the steel, consequently, exhibits greater resistance to aggressive gaseous and liquid media, including that at increased temperatures.

In the basic layer, Ni and Cr are contained in silicon ferrite and a part of Cr is in carbides. Ni in solid solution improves hardenability and toughness of the layer.

Manganese in the surface and basic layers improves hardenability of bimetallic steel. It, however, promotes fast grain growth which embrittles the steel structure. Alloying with carbide-forming elements, such as V, W, Ti, Nb, Zr, enhances reduction of microstructure during heat treatment of steel, and affects the redistribution of carbon between disperse carbides and austenitic and martensitic areas of the microstructure (FIG. 6).

By way of example, while preventing formation of chromium carbides over grain boundaries, Mo contributes to prevention of inter-crystallite erosion in the surface layer, improves hardenability, static, dynamic and fatigue resistance, and reduces cold fragility threshold in the basic steel layer. All these factors permit the mechanical properties of the layers to be influenced so that to improve strength and impact toughness of the structure under certain conditions.

Alloying with Y and REM permits the grain growth to be restricted at the step of melting and solidifying the steel, this having a beneficial effect on mechanical properties of the rolled products at subsequent processing. Nitrogen and carbon are the main elements which by reacting with the aforementioned alloy additives form carbide, nitride phase and more often a complex carbonitride non-metallic phase in the form of disperse particles which act as structural barriers at the path of travel of grain boundaries and dislocations, and thereby influence the structure parameters and plastic and strength properties.

Carbon content affects, inter alia, the amount of residual austenite and martensitic phase in the rolled product layer structure, this also dictating mechanical properties of the rolled products under certain conditions.

When producing clad rolled products in which the surface layer having a thickness of up to 20% in the cross-section of the bimetallic ingot consists of a ferritic stainless steel containing 3% Ni and 10–25% Cr, with the Si/Al ratio in the basic layer less than (1+Ni/Cr), Al contained in solid solution increases the martensitic transformation temperature to Such an extent that a part of the diffusion and basic layer volume enriched with carbon and aluminium undergoes martensitic transformation when cooled after hot rolling step (FIG. 7). After martensite disintegration, the basic layer and especially the diffusion layer embrittle, i.e. the dislocations, slipping at plastic deformation, are stopped at martensite areas and here microfractures are often formed in the structure and interlayer bond strength decreases.

When producing clad rolled products in which the surface layer having thickness up to 10% in the cross-section of the bimetallic ingot consists of a ferrite stainless steel containing ≦3.0% Ni and from 10 to 25% Cr at the optimal Si/Al ratio in the basic layer equal to (Si/Al)≧(1+Ni/Cr), a poorly carbon-enriched ferritic structure is persistently stabilized in the diffusion layer. In this case, in the diffusion and basic layers a considerable part of carbon is retained in solid solution of alloyed ferrite, while the remaining part of carbon precipitates as disperse and uniformly distributed carbides throughout the microstructure of the layers (FIG. 8). In addition, the solid solution Fe—Si—Al—Cr disintegrates and a new high strength phase $\{Fe_{1-x-y}(Si,Al)_xCr_y\}$ forms in the diffusion layer under certain thermal conditions, and when the surface layer thickness is 10–20%, the diffusion layer can grow in depth of the basic and surface layers, and even distribute over the cross-section of the rolled products between the surface stainless layers (FIGS. 9,10). The relative thickness of the surface stainless layer of the initial composition may reduce in this case.

The above factors contribute to the achievement of the highest values of mechanical strength, impact toughness of the basic and intermediate layers, and bond strength of the surface layer, while the surface may retain superior corrosion resistance if the thickness of the surface layer with the initial composition remains sufficient (no less than 5%).

A clad steel rolled section having a surface layer of 6–25%, and Si/Al ratio in the basic layer less than (2—Ni/Cr) promotes reduction in the martensitic transformation temperature in the diffusion layer whereto Cr and Ni additionally diffuse from the surface layer. When the rolled products are cooled, disperse carbide phase precipitates from martensite and residual austenite on numerous defects of the structure, including carbon-enriched inter-phase and grain boundaries (FIG. 1), therefore, the structure of the diffusion layer is prone to embrittlement by disperse hardening. Additionally, when Ni content is more than 5%, and Al content is more than 1% in the diffusion layer, disintegration of the Fe—Si—Al—Cr—Ni solid solution and formation of the new high strength $\{(Fe, Ni)_{1-x-y}(Si, Al)_xCr_y\}$ phase are slowed down. The above factors contribute to reduction in the surface-to-basic layer bond strength, and microfractures and stratification may occur during deformation in the tensile stress region of the clad rolled products.

When producing clad rolled products with a coating of an austenitic stainless steel having an optimum Si/Al ratio in the basic layer within the range (Si/Al)≧(2−Ni/Cr), a ferritic structure enriched in Si, Cr and poorly enriched in Ni,Al persistently stabilizes in the diffusion layer. A considerable part of carbon is retained in the solid solution of alloyed ferrite, while the remaining part of carbon precipitates in the form of disperse, uniformly distributed carbides of the $\{MeCr)_{23}C_6\}$ type throughout the microstructure of the diffusion layer (FIG. 8). Furthermore, the Fe—Si—Al—Cr—Ni solid solution disintegrates in the diffusion layer under certain thermal conditions and a new high-strength $\{(Fe,Ni)_{1-x-y}(Si, Al)_xCr_y\}$ phase is formed, where at the surface layer thickness of 10–20% the diffusion layer may grow in depth of the basic and surface layer and distribute over the entire cross-section of the rolled products between the surface stainless layers (FIGS. 9,10). The relative thickness (ψ) of the surface stainless layer with the initial composition may decrease to ψ=0.05 (FIG. 1). The above factors enhance mechanical strength and impact toughness of the basic and diffusion layers, and the bond strength of the surface layer to such an extent that the clad rolled products can withstand the most sophisticated deformation shaping without discontinuities in the coating, and thereby maintain the high level of corrosion resistance of the surface.

In the clad rolled products having the stainless austenitic or ferritic steel surface layer greater than 20% in the cross-section, economical efficiency and production practicability are lost, and if the surface stainless layer is less than 10%, Cr and Ni diffusion is insufficient to form a high-strength diffusion layer from the $\{(Fe,Ni)_{1-x-y}(Si, Al)_xCr_y\}$ phase over the section between the stainless layers. In addition, the remaining thickness (less than 5%) of the stainless layer with the initial composition may be insufficient to adequately prevent corrosion of the rolled products.

A method for producing clad rolled products comprises the steps of: melting steel for a basic and surface layers, assembling a bimetallic ingot, hot rolling the ingot to obtain a billet and heat treating the billet. If the above conditions of the invention are met, the Fe—Si—Al—Cr—Ni solid solution may disintegrate in the diffusion zone under predetermined thermal conditions and form a new high-strength $\{(Fe,Ni)_{1-x-y}(Si,Al)_xCr_y\}$ phase, this permitting the surface and basic layers to be very strongly bound. The billet is then hot rolled in several passes by calibrated rolls to a bimetallic bar, then the bar is hot rolled by calibrated rolls with corrugated surface, the maximum depth (or height) $H_0$ of corrugations on the surface of rolls (bar) should not be exceed the ratio (ψ·d) where ψ is the relative thickness of the surface layer, and d is the diameter (mm) of the rolled bar (FIG. 1). When the above conditions are met, the obtained corrugations on the surface of the rolled bar provide a quality bond with concrete mix, and the surface corrosion-resistant layer over the entire corrugated section is not thinned more than by half the original relative thickness. This ensures reliable corrosion prevention over the entire surface of the ribbed bar and improves corrosion resistance of the rolled products.

If the bimetallic bar production involves rolling through corrugated rolls having the corrugation height (or depth) beyond the above ratio, particularly, $H_o>(\psi \cdot d)$, then an extremely thinned surface layer and even breaks and microfractures in the coating may be observed at some corrugated sections at the maximum non-uniform deformation regions (FIG. 1). In corrosion tests those regions demonstrate obvious corrosion traces, such as rust pitting.

The clad rolled products made from the bimetallic billet may be rolled in several passes by rolls with plain body to a bimetallic strip with a thickness ($h_0$) and a coating ($\psi$), and then rolled on a body with corrugated surface observing the ratio $0.2 \leq (h_1/h_0) \leq 1$, the corrugated strip is then rolled or press formed at a temperature of $\leq 1150°$ K to a half-tube section with a surface curvature (1/D) in the cross-section within the relationship $(5 \cdot h_0/D) \leq 1$, where $h_1$ is the depth (height) of corrugations at the surface of the strip (rolls), $h_0$ is the strip thickness, and $\psi$ is the relative thickness of the stainless layer (FIG. 2). The above optimal process parameters promote the attainment of maximum strength and corrosion resistance of the strip and the reinforcing section due to restriction of negative impact of nonuniform deformation across the strip section and structural transformations. By way of example, when the $((h_1/\psi \cdot h_0) \leq 1)$ ratio is observed, nonuniform deformation of the surface layer, when rolled by corrugated rolls at maximum peak plastic yielding regions of the coating metal, is limited by its thinning no more than by half relative to the region with uniform plastic yielding. That is to say, if the relative thickness of the coating is 10% of the cross-section of the rolled product, then the coating is thinned in peak deformation regions no more than up to 5% of the rolled product cross-section, provided the optimum relationship of the corrugation height on the tool (roll), strip and coating thickness is observed. This provides a continuous, defect-free coating, thereby improving its corrosion resistance. once the strip has been deformed to a half-tube, a considerable nonuniformity in drawing the metal appears in the strip cross-section in different layers, and the greater the bend curvature (or the less the half-tube diameter), the more the external convex surface is deformed by extension relative to the internal surface (FIGS. 12–14). If the $(5 \cdot h_0/D) \leq 1$ ratio is met, the relative extension of the external surface, as compared to the inner surface, is no greater than 25%, this allowing a desired reinforcing section to be formed from the strip of a predetermined thickness without defects and microfractures on the external surface of the half-tube, and the corrosion resistance to be improved thereby. The optimum temperature of forming the half-tube section with process parameters specified by the invention may be from room temperature to 1150° K Mechanical strength of the clad rolled products increases with reduction of the deformation temperature due to deformation defects and hardening of the structure, while impact toughness, on the contrary, reduces for the same reasons, but their parameters do not go beyond the permissible standard limits.

When rolling is effected by corrugated rolls, if the corrugation depth on the surface strip is greater than the upper limit $(h_1/\psi \cdot h_0) > 1$, the surface layer in maximum deformation nonuniformity regions may be thinned more than by half, and microfractures may be observed in the coating. Obvious corrosion traces such as rust pitting can be revealed in this regions in corrosion tests.

When rolling is effected by worn rolls, if the corrugation height on the roll surface is less than the lower limit $(h_1/\psi \cdot h_0) < 0.2$, the obtained corrugation depth and structure on the reinforcing section is insufficient to provide a required bond strength and adherence of concrete mix.

Forming the half-tube at a temperature above 1150° K leads to excessive softening and embrittlement of the basic and surface layer structure of the rolled products due to enrichment of the inter-phase and grain boundaries with carbide phase, coagulation, carbide and martensite phase growth, and increased grain size. This impairs mechanical strength and toughness of the clad rolled products.

Forming the half-tube with a surface curvature exceeding the $(1/5h_0)$ ratio results in great plastic deformation nonuniformity over the strip section (>25%), which leads to appearance of microfractures in the coating on the external (convex) half-tube surface. Corrosion traces, such as rust pitting, appear on the convex surface in corrosion tests.

BRIEF DESCRIPTION OF THE DRAWINGS

Other objects, features and advantages will occur to those skilled in the art from the following description of preferred embodiments and the accompanying drawings, in which.

DESCRIPTION OF AN EMBODIMENT OF THE INVENTION

Figure 1:
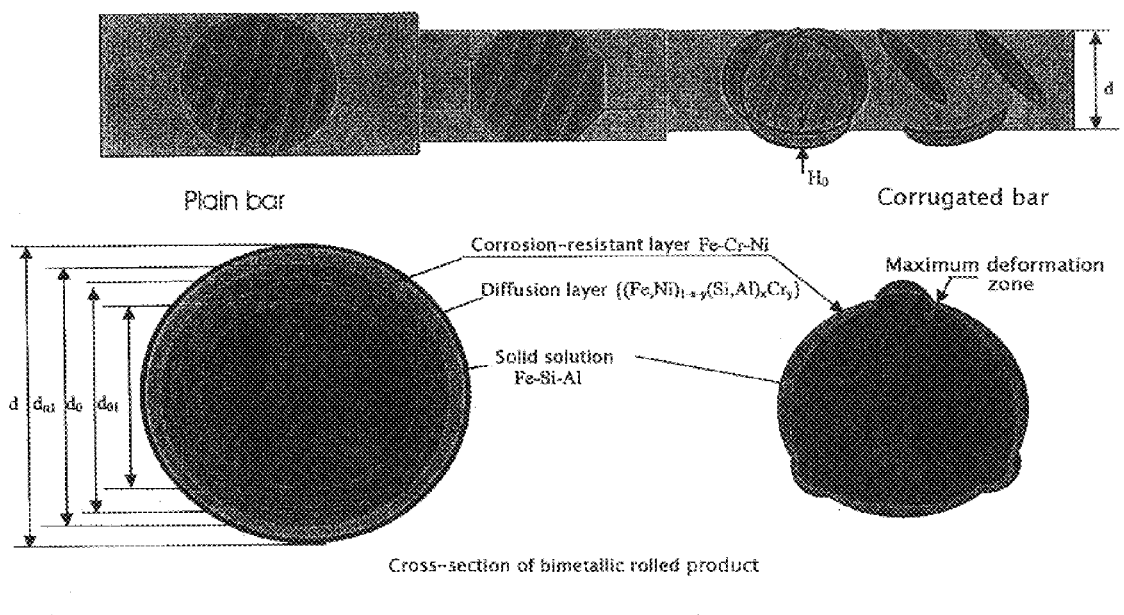
FIG. 1 shows a schematic view of a clad bar with plain and corrugated surface.
Figure 2:
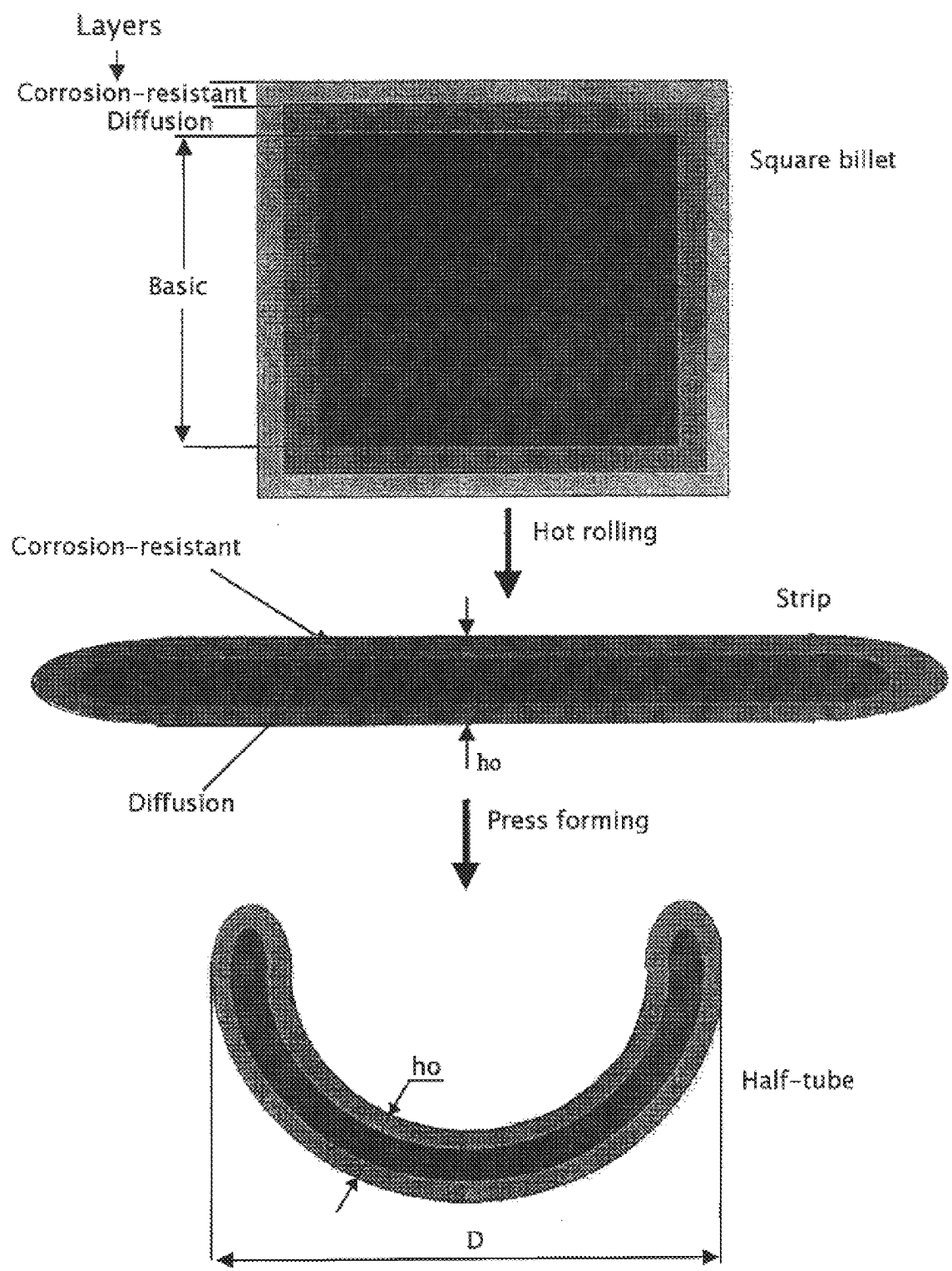
FIG. 2 shows schematically cross-sections of a clad billet, strip and half-tube.
Figure 3:
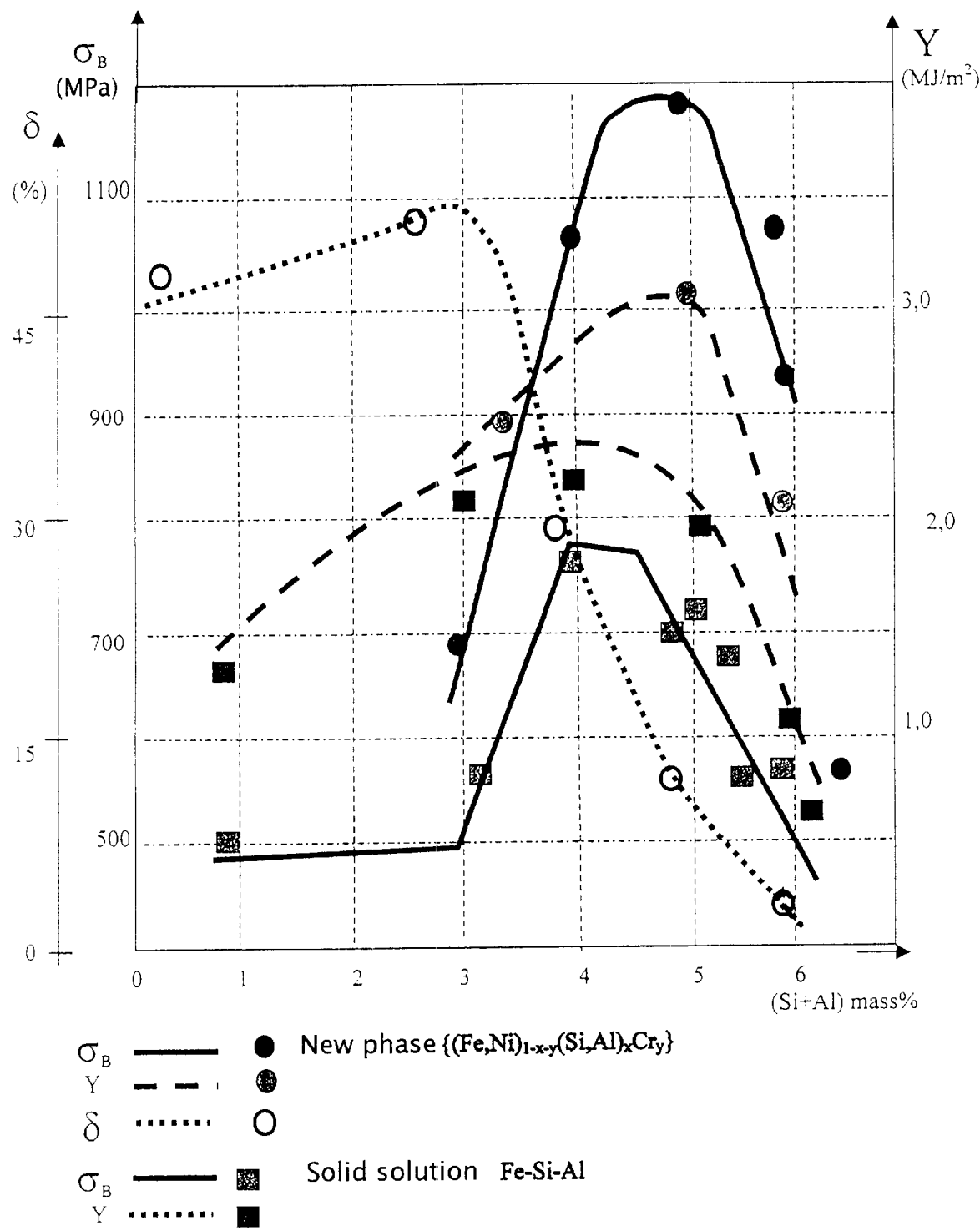
FIG. 3 shows mechanical properties of clad rolled products as a function of composition and structure of the basic layer, where $\sigma_B$ is the ultimate strength, Y is the impact toughness; $\delta$ is the extension elongation.
Figure 4:
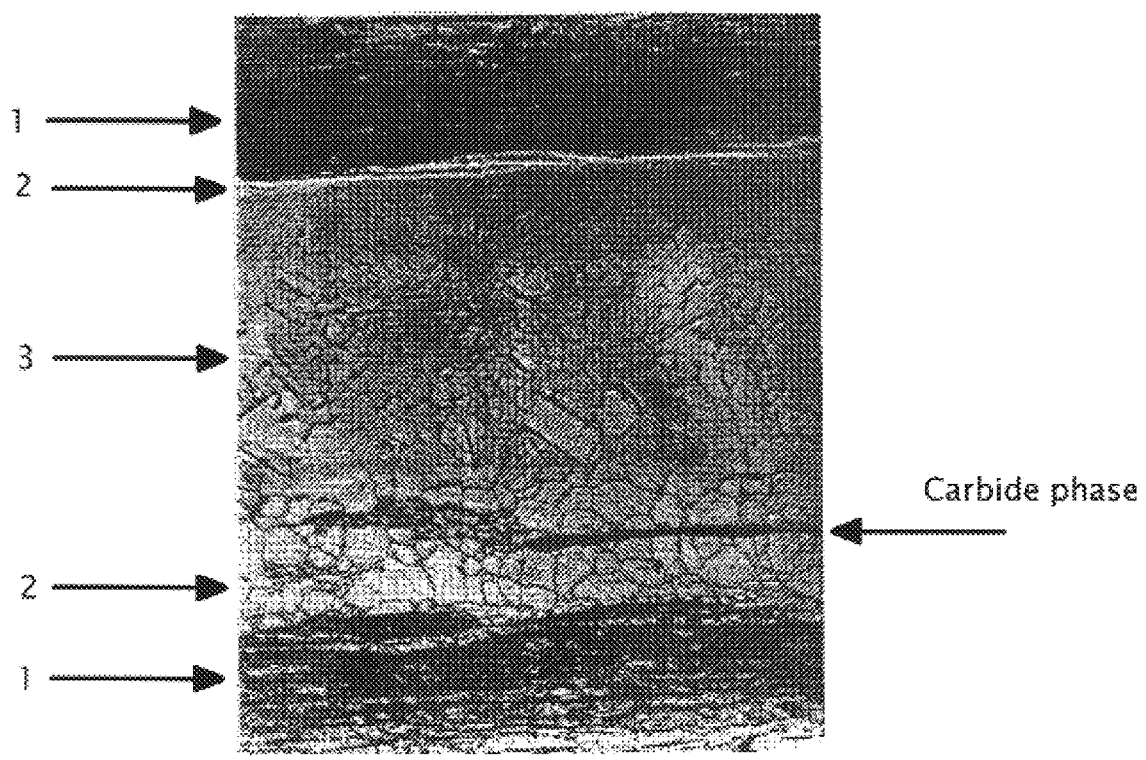
FIG. 4 shows a microstructure of a clad strip in the cross-section, where 1 is a surface stainless layer, 2 is an intermediate diffusion layer, and 3 is a basic layer.

Clad steel samples, fabricated in accordance with the present invention, comprised a surface and basic layers alloyed with Cr, Ni and Si, Al. Table 1 shows the content of the main (Cr, Ni) and accompanying elements in the surface layer, Table 2 shows the content of the main (Si, Al) and accompanying elements in the basic layer. Tables 3 and 4 show grade composition and structure, and content and proportion of main elements in the surface and basic layers of the clad samples (Nos. 1 to 30). Table 5 shows mechanical and corrosion properties, and the coating bond strength in samples 1 to 30. Table 6 shows parameters of clad rolled section and changes in properties of the samples after corrosion tests and deformation of the strip to a half-tube. Table 7 shows microstructure parameters over the cross-section of bimetallic samples before and after treatment (rolling and heat treatment), and properties and relative cost of the rolled products.

Steel having different content of Cr, Ni, Si, Al, and further containing Mn, Mo, W, V, Cu, Ti, Nb, Zr, Y, REM, C, N was melt in an induction vacuum furnace and poured in molds to produce hollow and cylinder billets with predetermined dimensions and compositions. Composition and dimensions of hollow billets (surface layer) are shown in Table 1. Composition and dimensions of cylinder billets (basic layer) are shown in Table 2. Cylinder billets were inserted into hollow billets. Than, to prevent oxidation of the interface when heated, the inter-layer boundary was sealed at the ingot end face. As the result, bimetallic ingots were obtained with Cr and Ni-alloyed corrosion-resistant surface layer over the entire perimeter, and having a basic layer of Si and Al-alloyed steel in the center portion (Tables 3,4).

The bimetallic ingots were heated and subjected to reversing hot rolling at a stand with rolls 300 mm in diameter in several passes through the "rhomb-square" pass sequence to produce an intermediate billet of 40×40 mm size. After heat treatment, a portion of the square billets were subjected to further hot rolling at a stand with roll 250 mm in diameter through the "oval-circle" pass sequence to a bar with a diameter of 20–14 mm, another portion of billets were hot rolled at another stand with plain roll body to a strip 5–3 mm thick. In last passes of hot rolling the bimetallic clad bars, a trilateral involute asymmetry in cross-section and calibration of ribbed profile were set at rolls with corrugated surface, with the corrugation depth varying from. 0 to 2 mm. In hot rolling of bimetallic clad strips, the final pass was performed through rolls with a surface corrugated according to a rhomb pattern of periodically arranged cells, the rhomb having a face width of 5 mm, repeated each 20 mm, the corrugation height being from 0 to 0.5 mm. A portion of the corrugated strips were deformed at a temperature from room temperature to 1160° K by press forming using a cylindrical punch stamp to produce a half-tube section with various surface curvature. Table 6 shows parameters of the clad rolled section and process parameters of its treatment when corrugated bars, strips and deformed half-tubes were manufactured.

After hot deformation the bimetallic rolled billets and clad rolled sections were heat treated to form a predetermined multiphase macrostructure in the cross-section. Composition and parameters of the macrostructure in the cross-section influence the properties and cost of rolled products. Table 7 presents parameters of multiphase macrostructure in the cross-section before and after treatment of bimetallic samples, and properties and relative cost of the rolled products.

To manufacture a conventional billet, rectangular samples were prepared with predetermined dimensions and compositions of surface and basic layers (Tables 1 and 2), then a three-layer pack was assembled and sealed over the perimeter of the layer connection boundaries, the obtained three-layer billets with the cross-section of 28×60 mm were rolled in several passes to strips 3×80 mm. When rolled, a large portion (up to 25%) of metal of the basic layer "outflowed" from under the coating due to lateral spread, and this resulted in substantial change of relative thickness and area of the surface stainless layer as compared to the original ones. For tests in accordance with the other samples, strips of up to 60 mm in width were cut from the conventional rolled products, wherein side end faces were not protected against corrosion either, however, the relative surface area without coating was substantially reduced.

The ingots and rolled products in accordance with the closest prior art were produced by the process flowsheet identical to that used to prepare the other samples of the invention.

Samples were taken at different stages of hot rolling and heat treatment to test microstructure and distribution of Cr, Ni, Si, Al in the cross-section of bimetallic rolled sections, and impact toughness, mechanical strength and percent elongation.

Inter-layer bond strength was tested by Ericsen method [4], using deformation of the clad planar samples by impressing a spherical surface with the aid of a ball D=10–20 mm at a room temperature.

Corrosion tests were conducted during 42 days in 10% nitric acid solution by weighing the samples before immersion and after withdrawal from the solution. A specific parameter $g_k$ (g/m$^2$ per hour) was calculated on the basis of the total weight loss during test period of about 1000 hours.

To determine relative adherence strength between reinforcing sections and concrete, cube-shaped molds were made (with 100 mm face) and filled with concrete mix prepared on the base of high-alumina cement, then a reinforcing section was placed in the central portion of the cube so that a length of 10 mm protected from one side. Upon complete solidification cycle (20 days), the reinforcing section was pressed out until it started to displace. A relative bond strength with concrete mix was determined by the applied force as compared with a sample with plain surface.

Table 5 shows results of mechanical and corrosion tests of rolled bimetallic samples Nos. 1 to 30, and thickness of the diffusion layer. Table 6 further shows variation of mechanical and surface properties after corrosion tests of some samples. The variations partially result from hydrogenation and destructive corrosion effect on surface layers of the samples. In addition, Table 6 also shows results of testing the reinforcing sections as to the bond strength with concrete mix.

In conclusion, compositions of samples Nos. 2 to 8, 10 to 12 (Table 3), and 17 to 22, 24 to 27 (Table 4) correspond to the present invention; compositions of samples Nos. 1,9,13 (Table 3) and 16, 23, 28 (Table 4) are outside the boundary conditions of the invention, compositions of samples Nos. 14, 19 correspond to the prior art, and compositions of samples Nos. 15, 30 correspond to the closest prior art (Tables 3 and 4).

Furthermore, samples Nos. 3, 4, 6 to 8, 10 and 17 to 19, 21, 22, 24, 25, 27 (Tables 3 and 4) with a predetermined structure and phase composition of the diffusion zone (Table 7) were produced in accordance with the present invention and exhibited improved mechanical and corrosion properties; samples Nos. 2, 11 and 20, 26 (Tables 3 and 4) exhibited a relatively low level of mechanical properties, corresponding to the lower limiting parameters in terms of suitability of the construction material for reinforcing concrete (Table 5).

Production of clad rolled section samples marked as $K_2$–$K_4$, $P_2$, $P_3$, $P_5$, $P_7$, $P_8$, $T_{2-T4}$ (Table 6) observed the conditions of the invention; while samples marked as $K_1$, $P_1$, $P_4$, $P_6$, $P_9$ and $T_1$ were outside the limiting conditions of the invention, where $K_I$ were corrugated ribbed bars, $R_i$ was a corrugated strip, $T_i$ was a half-tube, $K_5$ and $P_{10}$ were reference samples with plain surface.

As seen in Table 7, cost of the clad rolled products increased with increasing the thickness of the high-alloy steel surface layer in a bimetallic ingot, and it was more than 65% of the alloyed steel cost when the surface layer thickness was greater than 20%. It is however possible to form a wide, high-strength diffusion layer to ensure production of bimetallic rolled products with a higher level of mechanical and corrosion properties.

Consequently, to provide efficient production of high-quality clad steel rolled sections in accordance with the invention, bimetallic ingots were prepared, comprising the surface layer with a relative thickness of up to 20%, alloyed with Cr and Ni, and the basic layer containing, in percent by weight (1–6.0) Si and (0.1–5.0) Al in the ratio $3.0 \leq (Si+Al) \leq 6.0$, the layers further containing the alloying group of elements; the ingots were rolled to intermediate billets, the billets were then rolled to corrugated ribbed bars with a coating and a diameter in the ratio $(H_0/\psi \cdot d) \leq 1$, and to corrugated strips with a coating and a thickness in the ratio $0.2 \leq (h_1/\psi \cdot h_0) \leq 1$, half-tubes were prepared from a part of strips at a temperature of up to 1150° K, the half-tubes had wall thickness and surface curvature in the ratio $5 \cdot h_0/D \leq 1$. When the billets were made from ingots with the coating of ferritic steel containing $\leq 3\%$ Ni and 10–25% Cr and the basic layer containing Si and Al in the ratio $(Si/Al) \leq (1+Ni/Cr)$, or with the coating of austenitic steel containing 4–34% Ni and 6–25% Cr and the basic layer containing Si and Al in the ratio $(Si/Al) \geq (2-Ni/Cr)$, the rolled products exhibited the best mechanical and corrosion properties owing to formation, in the cross-section between the surface layers, of a wide diffusion layer containing the main alloying components within the relationships: $\{Fe_{1-x-y}(Si,Al)_x Cr_y\}$, $\{(Fe,Ni)_{1-x-y}(Si,Al)_x Cr_y\}$, where $x+y \leq 18$.

Analysis of the results evidences that the present invention provides the beneficial effect: the invented clad steel rolled section for reinforcing concrete exhibits, as compared to the prior art, essential advantages such as improved mechanical strength, impact toughness, inter-layer strength and corrosion resistance of the surface.

The invented method will be useful in metallurgy to produce relatively inexpensive corrosion-resistant and high-strength reinforcing section for concrete.

TABLE 1

| Billet mark | Cr | Ni | Si | Al | Mn | Mo | W | V | Cu | Ti | Nb | Zr | Y | REM | N | C | Ext. | Internal | Steel characteristics and structure | (Ni/Cr) |
|---|---|---|---|---|---|---|---|---|---|---|---|---|---|---|---|---|---|---|---|---|
| 1-p | 25 | 34 | 0.5 | 0.5 | 0.5 | 0.1 | 4.0 | 0.5 | 0.1 | 0.1 | — | — | — | — | — | 0.05 | 100 | 80 | heat resistant, austenitic | 1.4 |
| 2-p | 20 | 18 | 0.5 | 0.5 | 0.5 | 6.0 | 0.1 | 0.1 | — | 0.1 | — | — | — | — | 0.02 | 0.04 | 100 | 80 | high-strength, salt water-resistant, austenitic | 0.9 |
| 3-p | 15 | 15 | 0.2 | 4.0 | 2.0 | 3.0 | — | — | 3.0 | 1.0 | — | 1.0 | 0.5 | 0.5 | — | 0.1 | 100 | 70 | fused carbonate-resistant, austenitic | 1.0 |
| 4-p | 17 | 18 | 6.5 | 0.06 | 1.6 | — | — | — | — | 1.0 | — | — | — | 0.01 | — | 0.02 | 100 | 80 | nitric acid-resistant, austenitic | 1.1 |
| 5-p | 18 | 10 | 0.1 | 0.1 | — | — | — | — | — | 0.2 | — | — | — | — | — | 0.12 | 100 | 90,80,70,60 strips 4 × 60 × 100 | SUS 321 S12, austenitic | 0.6 |
| 6-p | 6.0 | 4.0 | 1.5 | 1.5 | 4.5 | — | 4.0 | — | — | — | 0.5 | 0.5 | — | 0.2 | 0.8 | 0.5 | 100 | 80,60 | high-strength, viscous, austenitic-ferritic | 0.7 |
| 7-p | 10 | 3.0 | 1.0 | 1.0 | 1.2 | 1.0 | — | — | 5.0 | — | 0.5 | — | — | — | 0.01 | 0.01 | 100 | 80 | $CO_2$—$H_2S$-resistant, ferritic | 0.3 |
| 8-p | 17 | 0.1 | 0.1 | 0.1 | 0.1 | — | — | — | — | — | — | — | — | — | — | 0.08 | 100 | 80,70,60 strips 4 × 60 × 100 | SUS 430 S15, ferritic | 0.0 |
| 9-p | 25 | 1.0 | 0.1 | 0.1 | — | — | — | — | — | — | — | — | — | — | 0.01 | 0.06 | 100 | 90,80 | heat-resistant, ferritic | 0.0 |

TABLE 2

| Billet mark | Cr | Ni | Si | Al | Mn | Mo | W | V | Cu | Ti | Nb | Zr | Y | REM | N | C | (Si + Al) | Si/Al | Billet dimension(mm) | Conditions of invention |
|---|---|---|---|---|---|---|---|---|---|---|---|---|---|---|---|---|---|---|---|---|
| 1-o | 0.3 | 0.1 | 0.9 | 5.2 | 0.2 | — | — | — | — | — | — | — | — | — | — | 0.1 | 6.1 | — | Ø80 | beyond the conditions |
| 2-o | 1.0 | 3.0 | 1.0 | 5.0 | 0.1 | 1.0 | — | — | 0.5 | — | — | — | — | — | 0.5 | 0.8 | 6.0 | 0.2 | Ø80 | |
| 3-o | 0.1 | 0.1 | 3.0 | 2.0 | 0.5 | 0.5 | — | — | 0.1 | — | — | — | 0.1 | 0.1 | 0.01 | 0.2 | 5.0 | 1.5 | Ø80 | |
| 4-o | 0.2 | 0.1 | 3.0 | 2.3 | 0.1 | 0.1 | 0.1 | 0.1 | — | — | 0.1 | 0.1 | 0.1 | — | 0.01 | 0.15 | 5.3 | 1.3 | Ø80 | |
| 5-o | 0.1 | 0.1 | 3.0 | 2.5 | 0.3 | 0.1 | — | 0.1 | — | 01 | — | — | — | 0.1 | 0.01 | 0.06 | 5.5 | 1.2 | Ø80 | |
| 6-o | 0.5 | 0.1 | 3.5 | 2.5 | 0.1 | 0.1 | 0.1 | 0.7 | — | 01 | 0.5 | — | — | — | — | 0.3 | 6.0 | 1.4 | Ø70,60 | |
| 7-o | 2.0 | 0.5 | 4.5 | 1.5 | 0.3 | 0.4 | — | — | — | 0.1 | — | — | — | 0.1 | 0.02 | 0.04 | 6.0 | 3.0 | Ø80,60 | |
| 8-o | 3.0 | 3.0 | 5.9 | 0.1 | 3.0 | 1.0 | 0.5 | — | — | 0.3 | — | 0.5 | 0.2 | 0.2 | 0.02 | 0.4 | 6.0 | 59 | Ø70,60 | |
| 9-o | 0.1 | 0.1 | 6.1 | 0.05 | 0.5 | — | — | — | — | — | — | — | — | — | 0.01 | 0.4 | 6.15 | — | Ø80 | beyond the conditions |
| 10-o | 0.5 | 0.5 | 2.5 | 2.5 | 0.5 | 0.3 | — | 0.2 | — | 0.1 | — | — | — | 0.1 | 0.01 | 0.06 | 5.0 | 1.0 | Ø80,70 | |
| 11-o | 0.5 | 1.0 | 2.2 | 3.7 | 0.1 | 0.1 | — | 0.1 | — | 0.1 | — | — | — | 0.1 | 0.01 | 0.1 | 5.9 | 0.6 | Ø80,70 | |
| 12-o | 0.5 | 1.5 | 2.0 | 4.0 | 0.2 | 0.2 | — | 0.1 | 0.3 | 0.1 | — | — | — | 0.1 | 0.01 | 0.08 | 6.0 | 0.5 | Ø80 | |
| 13-o | 0.5 | 0.5 | 2.0 | 1.0 | 0.3 | 0.2 | 0.1 | 0.1 | 0.1 | 0.1 | 0.1 | 0.1 | — | — | 0.02 | 0.1 | 3.0 | 2.0 | Ø80,90 | |
| 14-o | 0.1 | 0.1 | 2.5 | 0.4 | 0.1 | — | — | — | — | — | — | — | — | — | 0.1 | 0.02 | 2.9 | — | Ø80 | beyond the conditions |

TABLE 2-continued

| Billet | Content of elements (wt. %) | | | | | | | | | | | | | | | | Billet | Conditions |
|---|---|---|---|---|---|---|---|---|---|---|---|---|---|---|---|---|---|---|
| mark | Cr | Ni | Si | Al | Mn | Mo | W | V | Cu | Ti | Nb | Zr | Y | REM | N | C | (Si + Al) | Si/Al | dimension(mm) | of invention |
| 15-o | 0.1 | 0.1 | 0.8 | 0.05 | 0.8 | — | — | — | — | — | — | — | — | — | — | 0.05 | 0.9 | — | strip 20 × 60 × 100 | prior art |
| 16-o | 3.0 | 2.5 | 7.0 | 0.1 | 1.0 | 0.2 | 0.1 | 0.2 | 0.1 | 0.1 | 0.1 | 0.3 | 0.1 | 0.1 | — | 0.02 | 7.1 | — | Ø80 | closest prior art |

TABLE 3

| Composition and structure of layers | Content of elements in layers (wt. %) | | | | | | | | Layer thickness (%) | Conditions of |
|---|---|---|---|---|---|---|---|---|---|---|
| | Basic layer | | | | Surface layer | | | | | |
| Sample No. | Si | Al | (Si + Al) | (Si/Al) | Cr | Ni | (Ni/Cr) | (1 + Ni/Cr) | main/surf | Invention |
| 1. Cr10Ni3Cu5//0,9 Si 5AlFerritic | 0.9 | 5.2 | 6.1 | 0.17 | 10 | 3.0 | 0.3 | 1.3 | 10/80 | not met |
| 2. Cr10Ni3Cu5//1 Si 5AlFerritic | 1.0 | 5.0 | 6.0 | 0.2 | 10 | 3.0 | 0.3 | 1.3 | 10/80 | not met claim 3 |
| 3. Cr10Ni3Cu5//3 Si 2AlFerritic | 3.0 | 2.0 | 5.0 | 1.5 | 10 | 3.0 | 0.3 | 1.3 | 10/80 | |
| 4. Cr10Ni3Cu5//3 Si 2,3AlFerritic | 3.0 | 2.3 | 5.3 | 1.3 | 10 | 3.0 | 0.3 | 1.3 | 10/80 | |
| 5. Cr10Ni3Cu5//3 Si 2,5AlFerritic | 3.0 | 2.5 | 5.5 | 1.2 | 10 | 3.0 | 0.3 | 1.3 | 10/80 | |
| 6. Cr17//3.5 Si 2.5Al Ferritic | 3.5 | 2.5 | 6.0 | 1.4 | 17 | 0.1 | 0.0 | 1.0 | 15/70 | |
| 7. Cr17//4,5 Si 1.5Al Ferritic | 4.5 | 1.5 | 6.0 | 3.0 | 17 | 0.1 | 0.0 | 1.0 | 20/60 | |
| 8. Cr17//5,9 Si 0.1Al Ferritic | 5.9 | 0.1 | 6.0 | 59 | 17 | 0.1 | 0.0 | 1.0 | 15/70 | |
| 9. Cr17//6 Si 0.0Al Ferritic | 6.1 | 0.05 | 6.15 | — | 17 | 0.1 | 0.0 | 1.0 | 10/80 | not met |
| 10. Cr25 Ni 1//2,5 Si 2.5AlFerritic | 2.5 | 2.5 | 5.0 | 1.0 | 2.5 | 1.0 | 0.0 | 1.0 | 10/80 | |
| 11. Cr25 Ni 1//2.2 Si 3.7AlFerritic | 2.2 | 3.7 | 5.9 | 0.6 | 25 | 1.0 | 0.0 | 1.0 | 10/80 | not met claim 3 |
| 12. Cr25 Ni 1//2,0 Si 1.0AlFerritic | 2.0 | 1.0 | 3.0 | 2.0 | 25 | 1.0 | 0.0 | 1.0 | 5/90 | |
| 13. Cr25 Ni 1//2,5 Si 0.4AFerritic | 1.5 | 0.4 | 2.9 | — | 25 | 1.0 | 0.0 | 1.0 | 10/80 | not met |
| 14. Cr17/0,8 Si 0.0Al Ferritic | 0.8 | 0.05 | 0.9 | — | 17 | 0.1 | 0.0 | 1.0 | 10/80 | prior art |
| 15. Cr17//7Si0.1Al Ferritic | 7.0 | 0.1 | 7.1 | — | 17 | 0.1 | 0.0 | 1.0 | 10/80 | cloest prior art |

TABLE 4

| Composition and structure of layers | Content of elements in layers (wt. %) | | | | | | | | Layer Thickness (%) | Conditions |
|---|---|---|---|---|---|---|---|---|---|---|
| | Basic layer | | | | Surface layer | | | | | |
| Sample No. | Si | Al | (Si + Al) | (Si/Al) | Cr | Ni | (Ni/Cr) | (2-Ni/Cr) | Main/surf. | invention |
| 16. Cr6Ni 4//0,9 Si 0.0Al Austenitic-ferritic | 0.9 | 0.05 | 1.0 | — | 6.0 | 4.0 | 0.7 | 13 | 10/80 | not met |
| 17. Cr6Ni 4//3.5CSi 2.5Al Austenitic-ferritic | 3.5 | 2.3 | 6.0 | 1.4 | 6.0 | 4.0 | 0.7 | 1.3 | 20/60 | |
| 18. Cr6Ni 4//3 Si 2.3Al Austenitic-ferritic | 3.0 | 2.5 | 5.3 | 1.3 | 6.0 | 4.0 | 0.7 | 1.3 | 10/80 | |
| 19. Cr18Ni10T//3.5Si 2,5Al Austenitic | 3.5 | 2.5 | 6.0 | 1.4 | 18 | 10 | 0.6 | 1.4 | 15/70 | |
| 20. Cr18Ni10T//3Si2,3Al Austenitic | 3.0 | 2.3 | 5.3 | 1.3 | 18 | 10 | 0.6 | 1.4 | 10/80 | not met claim 4 |
| 21. Cr18NiT//4.5Si 1.5Al Austenitic | 4.5 | 1.5 | 6.0 | 3.0 | 18 | 10 | 0.6 | 1.4 | 20/60 | |
| 22. Cr18Ni10T//5,9Si 0.1Al Austenitic | 5.9 | 0.1 | 6.0 | 59 | 18 | 10 | 0.6 | 1.4 | 20/60 | |
| 23. Cr18NiT//6i0.0Al Austenitic | 6.1 | 0.05 | 6.15 | — | 18 | 10 | 0.6 | 1.4 | 10/80 | not met |

TABLE 4-continued

| Composition and structure of layers | Content of elements in layers (wt. %) | | | | | | | | Layer Thickness (%) | Conditions of invention |
|---|---|---|---|---|---|---|---|---|---|---|
| | Basic layer | | | | Surface layer | | | | | |
| Sample No. | Si | Al | (Si + Al) | (Si/Al) | Cr | Ni | (Ni/Cr) | (2-Ni/Cr) | Main/surf. | |
| 24. Cr15Ni 15//2.5Si 2.5Al Austenitic | 2.5 | 2.5 | 5.0 | <u>1.0</u> | 15 | 15 | 1.0 | 1.0 | 15/70 | |
| 25. Cr25Ni34//2.2Si3.7Al Austenitic | 2.2 | 3.7 | 5.9 | <u>0.6</u> | 2.5 | 34 | 1.4 | 0.6 | 15/70 | |
| 26. Cr25Ni34//2Si4Al Austenitic | 2.0 | 4.0 | <u>6.0</u> | 0.5 | 25 | 34 | 1.4 | 0.6 | 10/80 | not met claim 4 |
| 27. Cr18Ni10T//2,0Si 1.0Al Austenitic | 2.0 | 1.0 | <u>3.0</u> | 2.0 | 18 | 10 | 0.6 | 1.4 | 5/90 | |
| 28. Cr18Ni 10T//2,5Si 0.4Al Austenitic | 1.5 | 0.4 | 2.9 | — | 18 | 10 | 0.6 | 1.4 | 10/80 | not met |
| 29. Cr18Ni10T/0,8Si 0.0Al Austenitic | 0.8 | 0.05 | 0.9 | — | 18 | 10 | 0.6 | 1.4 | 10/80 | prior art |
| 30. Cr18Ni 10T//7Si0.1Al Austenitic | 7.0 | 0.1 | 7.1 | — | 18 | 10 | 0.6 | 1.4 | 10/80 | closest prior art |

TABLE 5

Mechanical properties of bimetallic rolled products

Figure 5:
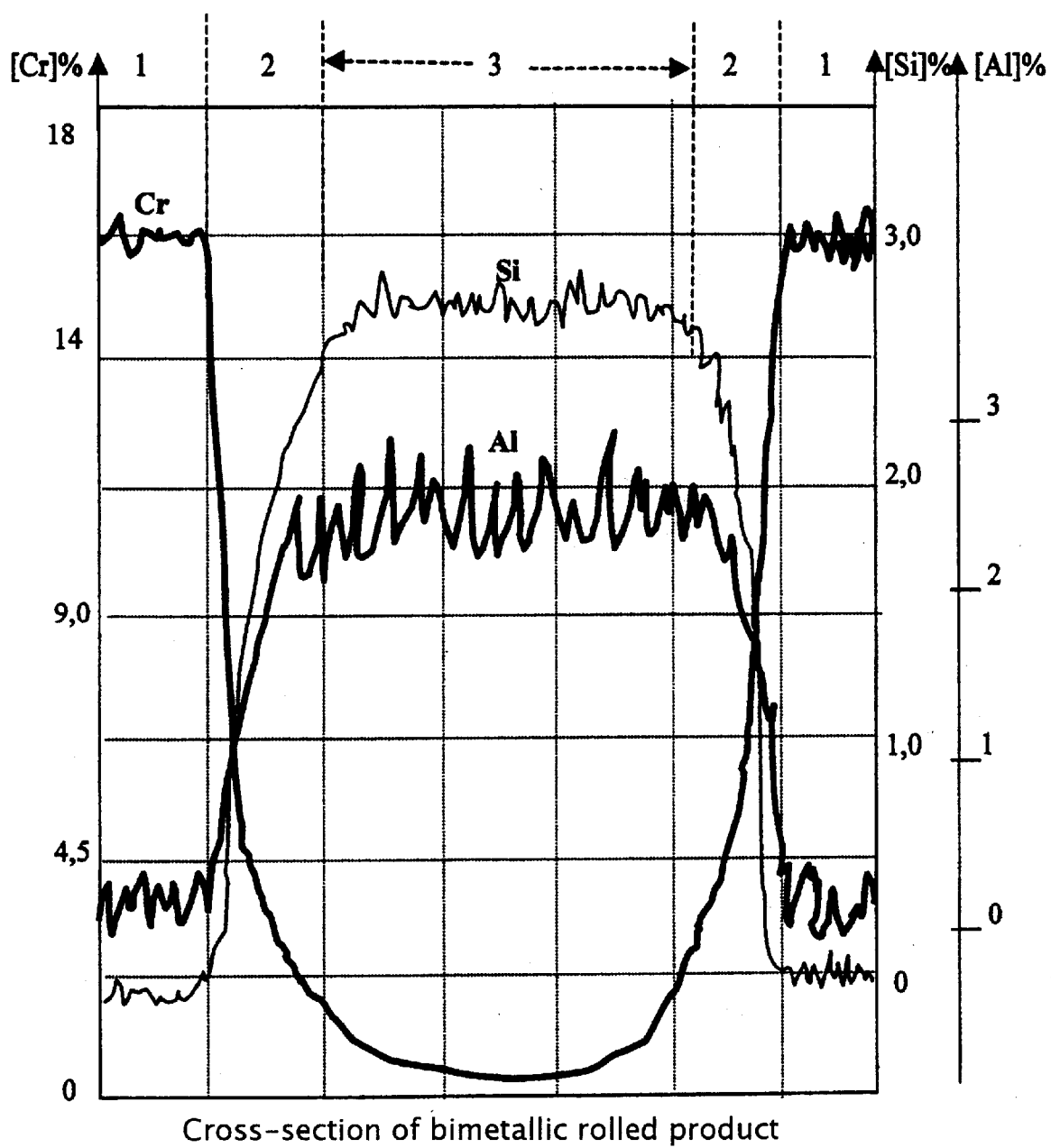
FIG. 5 shows distribution of elements Si, Cr and Al over the cross-section of bimetallic rolled products, where all layers have solid solution structure: surface layer (1), diffusion layer (2) and basic layer (3)
Figure 6:
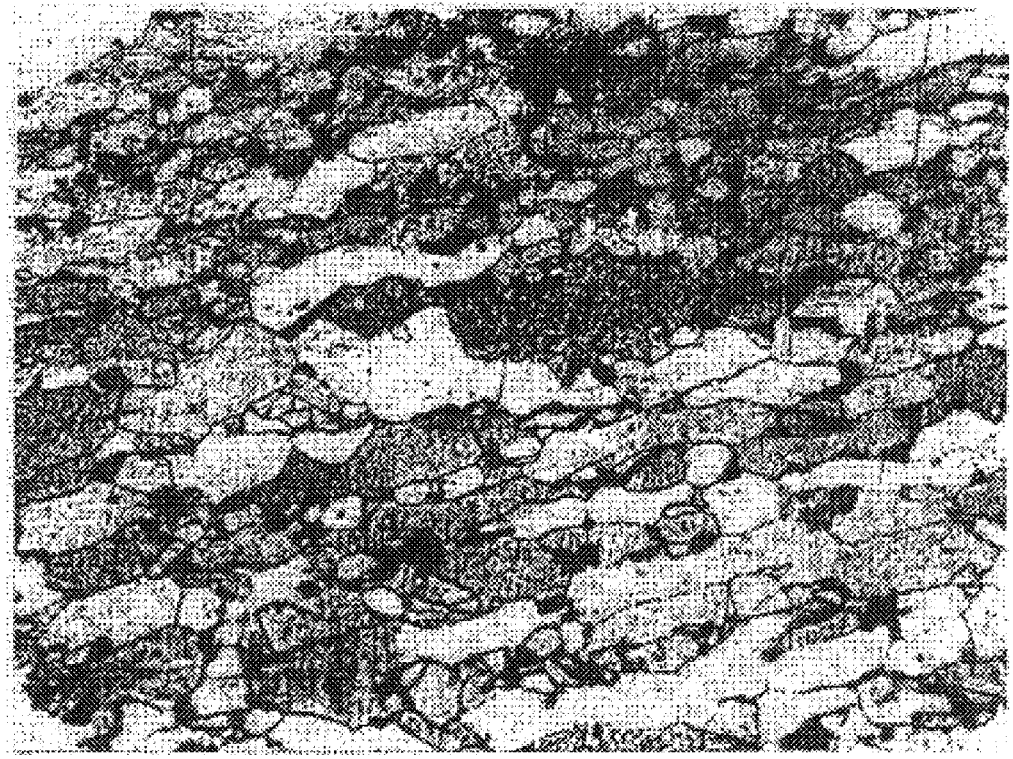
FIG. 6 shows a microstructure of silicon steel with ferritic and martensite-perlite grains.
Figure 7:
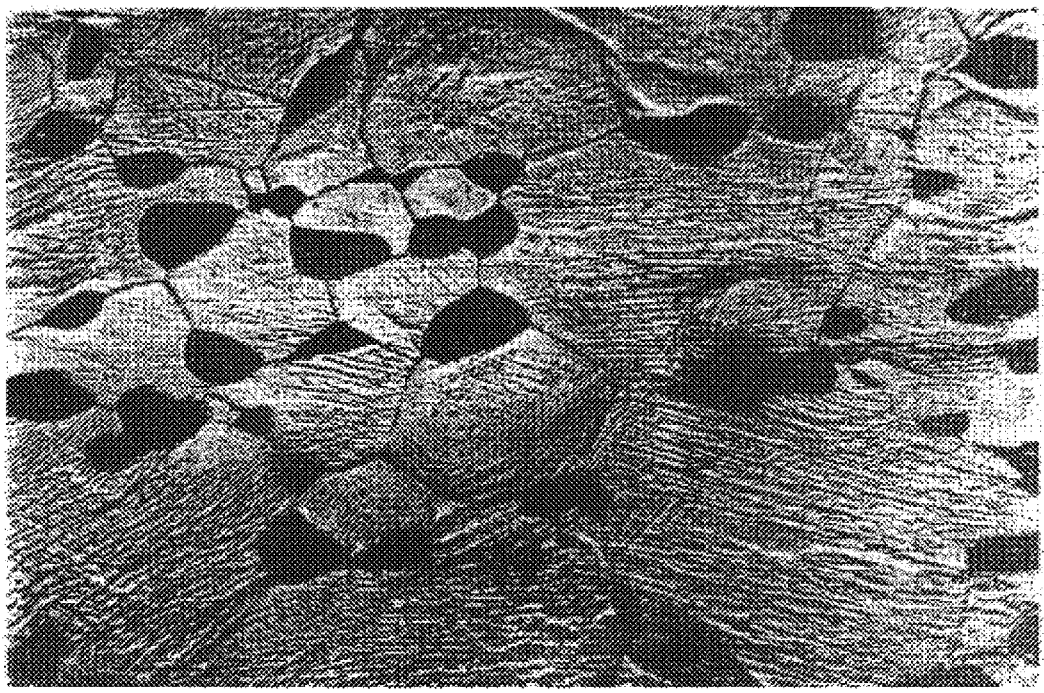
FIG. 7 shows martensitic precipitates over the grain boundaries in the diffusion zone.
Figure 8:
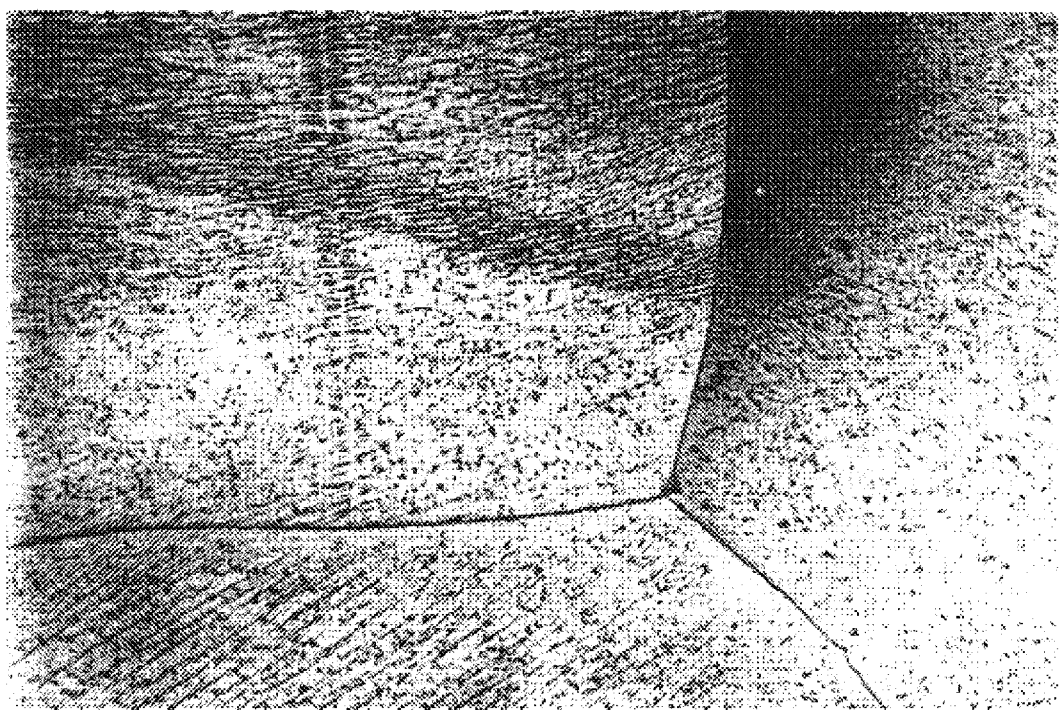
FIG. 8 shows disperse precipitates of carbide phase throughout the volume of grains in the basic and diffusion layer.
Figure 9:
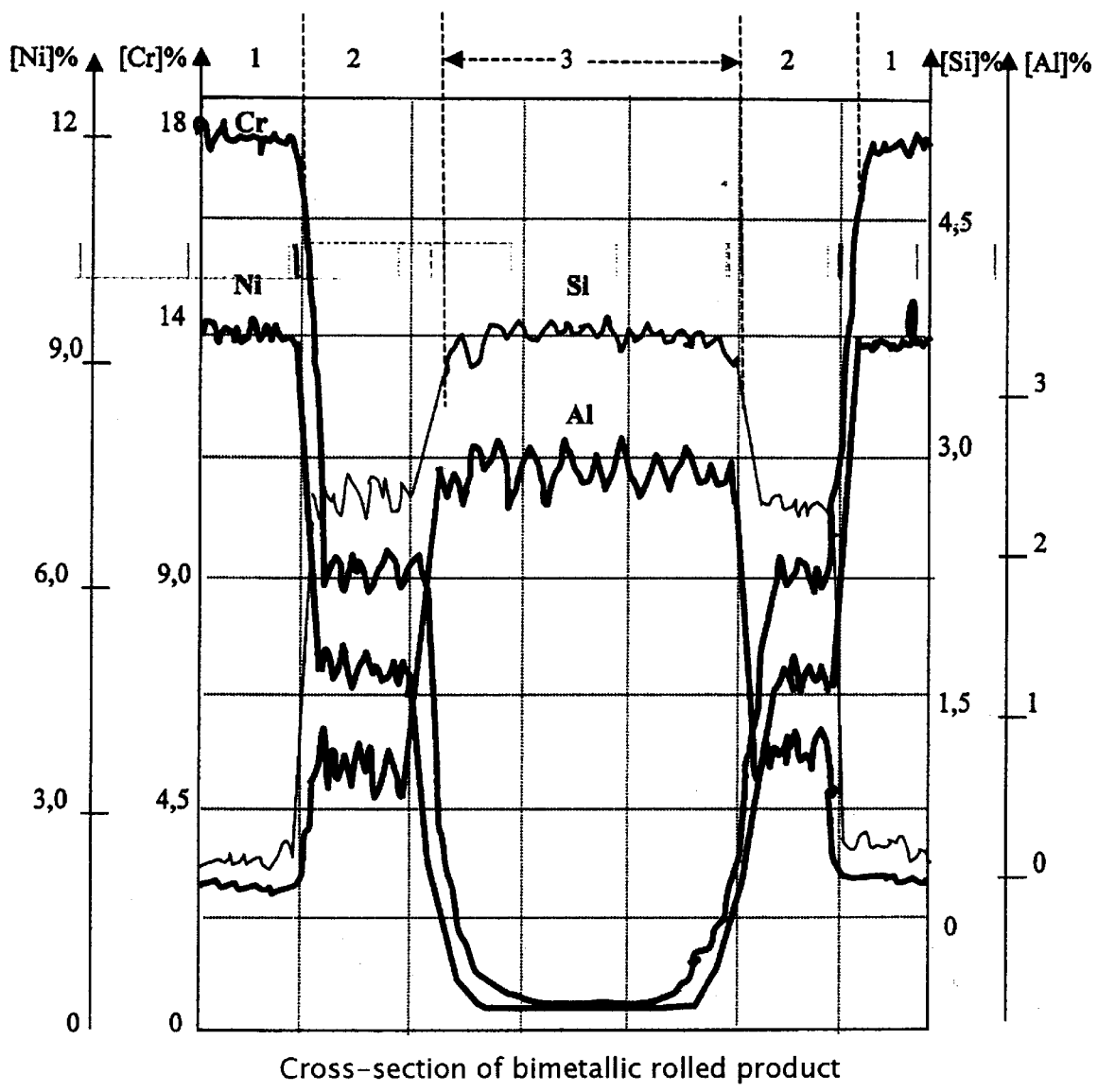
FIG. 9 shows distribution of elements Si, Al, Cr, Ni over the cross-section of bimetallic rolled products, where surface layer (1) and basic layer (3) have solid solution structure, and the intermediate diffusion layer (2) has $\{(Fe, Ni)_{1-x-y}(Si,Al)_x Cr_y\}$ phase structure.
Figure 10:
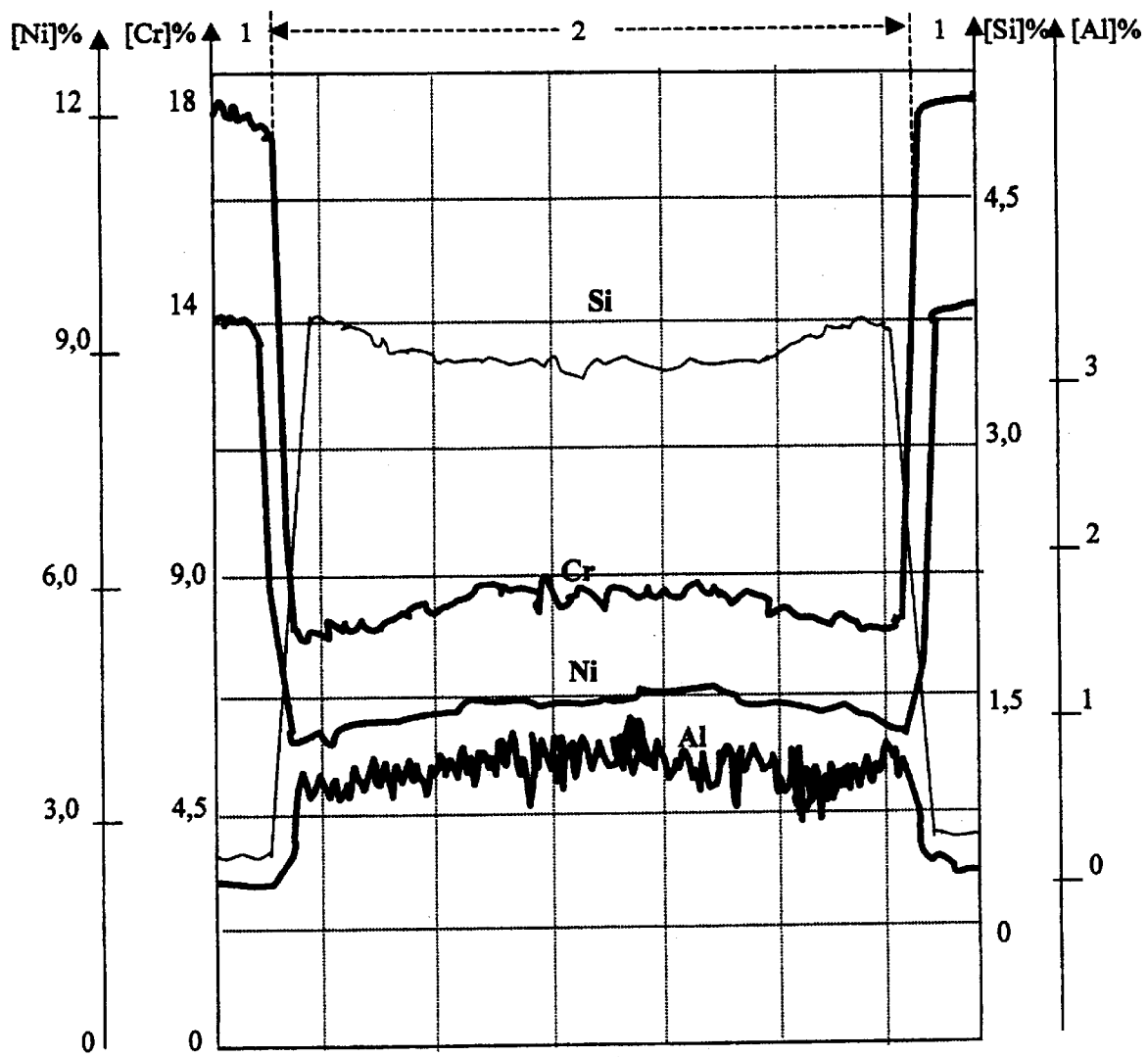
FIG. 10 shows distribution of elements Si, Al, Cr, Ni over the cross-section of bimetallic rolled products, where the surface layer (1) has initial composition of stainless steel coating and the diffusion layer (2) has $\{(Fe, Ni)_{1-x-y}(Si,Al)_x Cr_y\}$ phase structure over the entire section of the basic layer.
Figure 11:
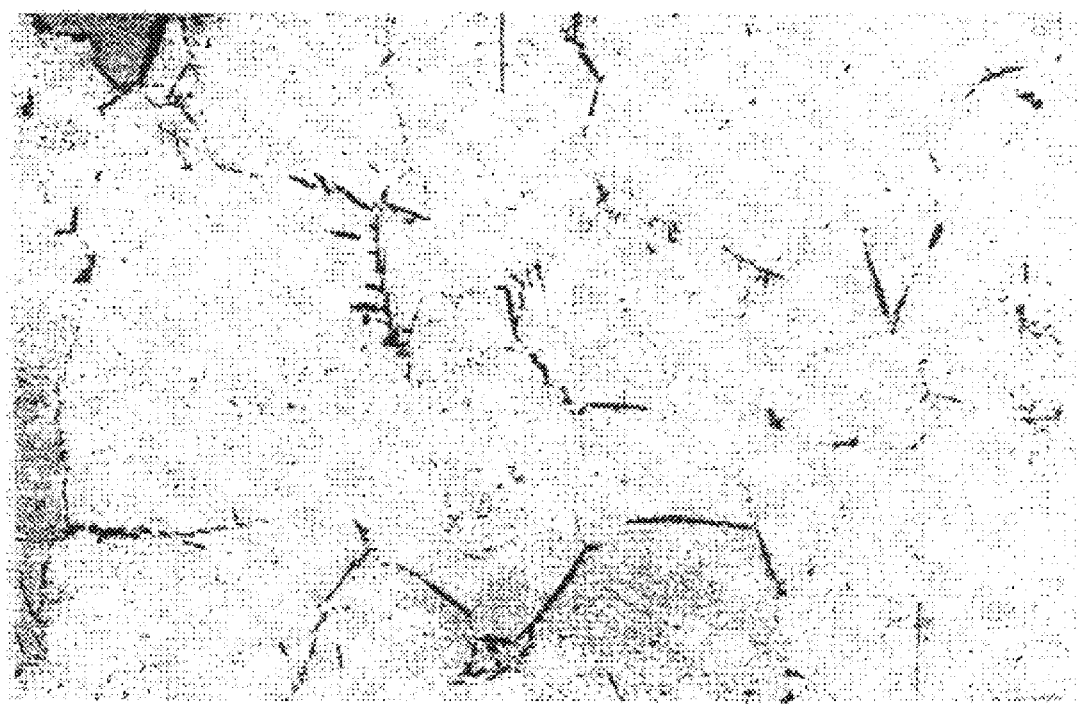
FIG. 11 shows carbide and martensite precipitates at grain boundaries of the diffusion layer.
Figure 12:
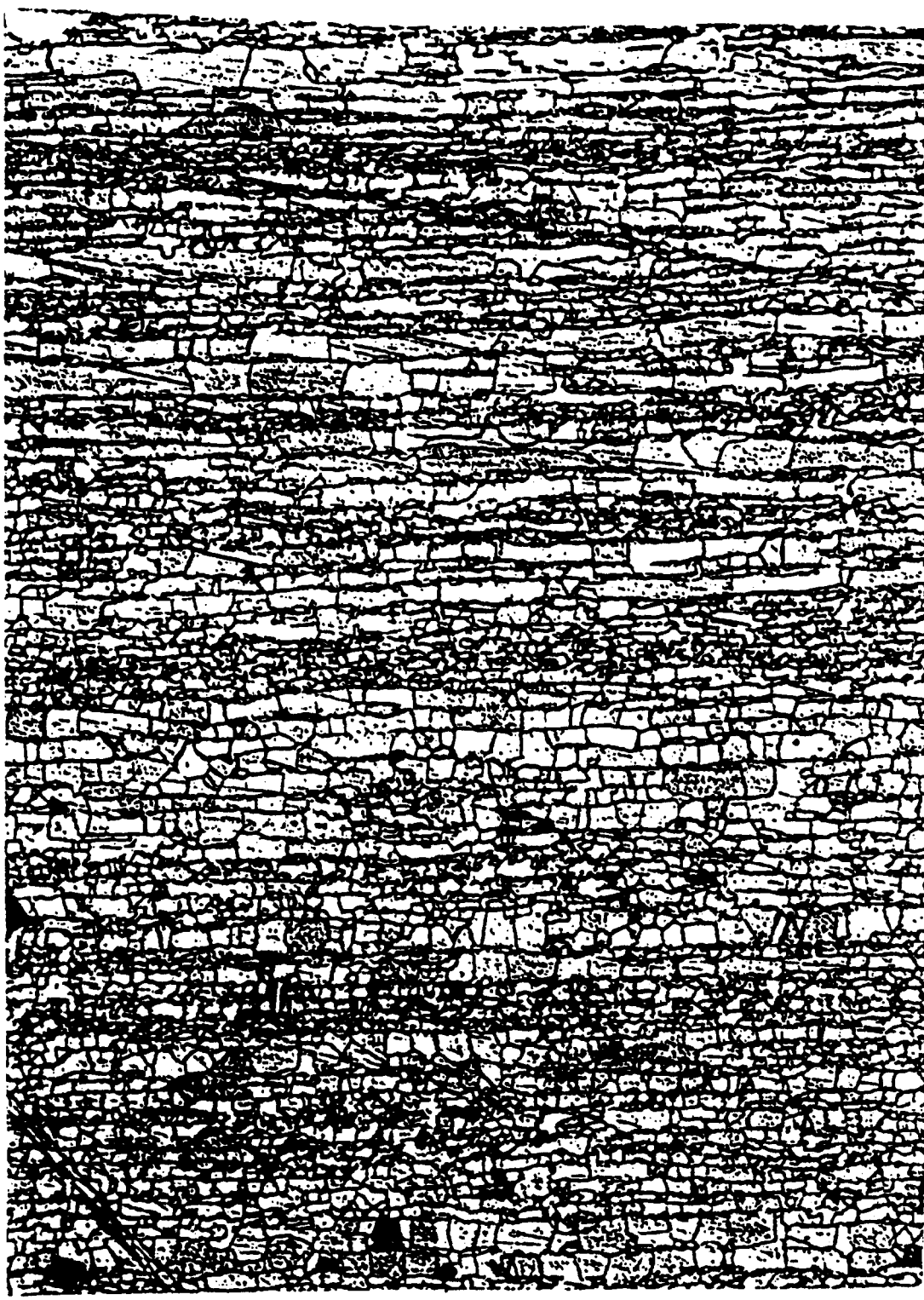
FIG. 12 shows an equilibrium microstructure of the surface layer of the strip after hot rolling and heat treatment.
Figure 13:
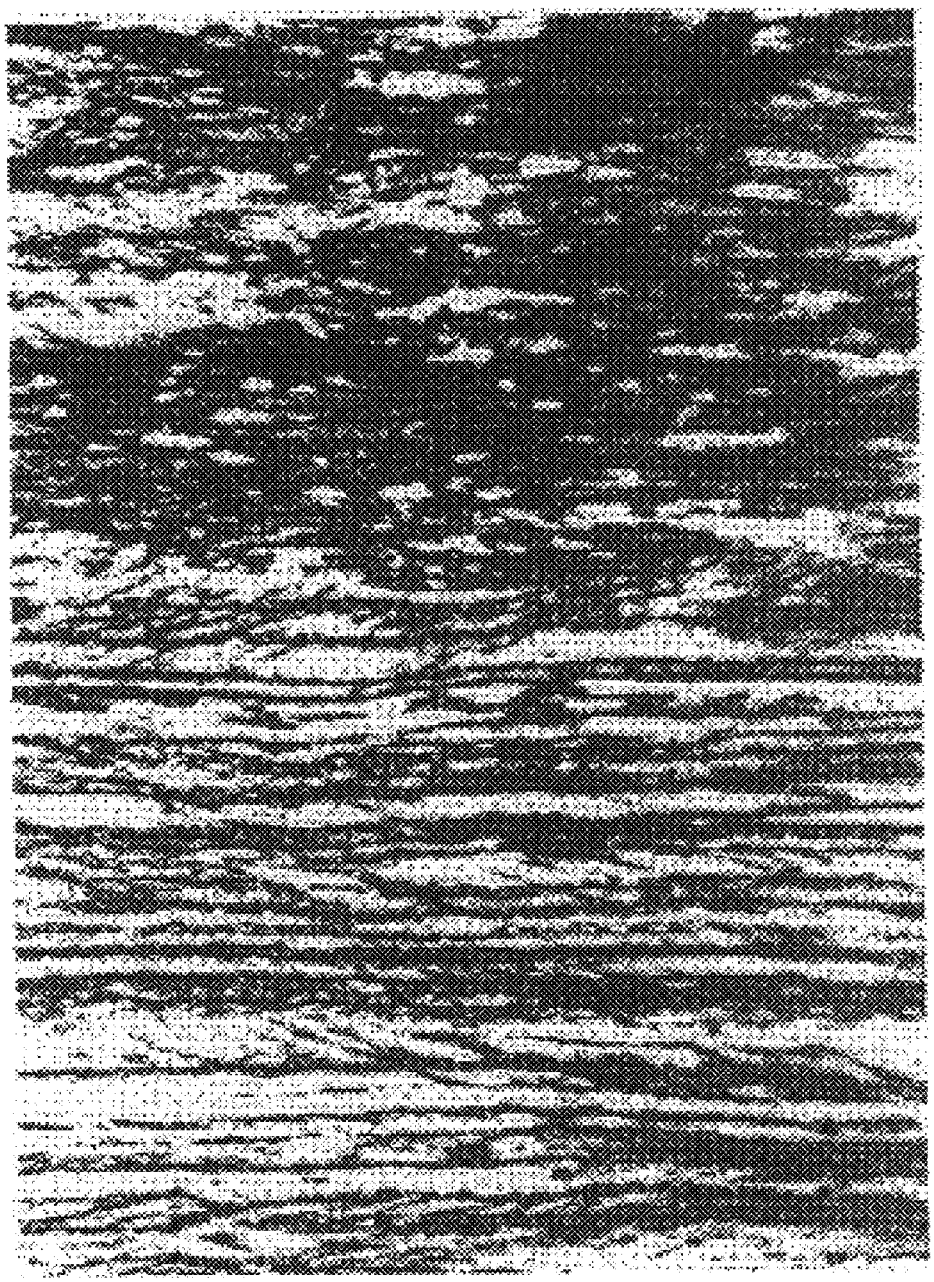
FIG. 13 shows a microstructure of the surface layer of the rolled half-tube at the convex side of the surface.
Figure 14:
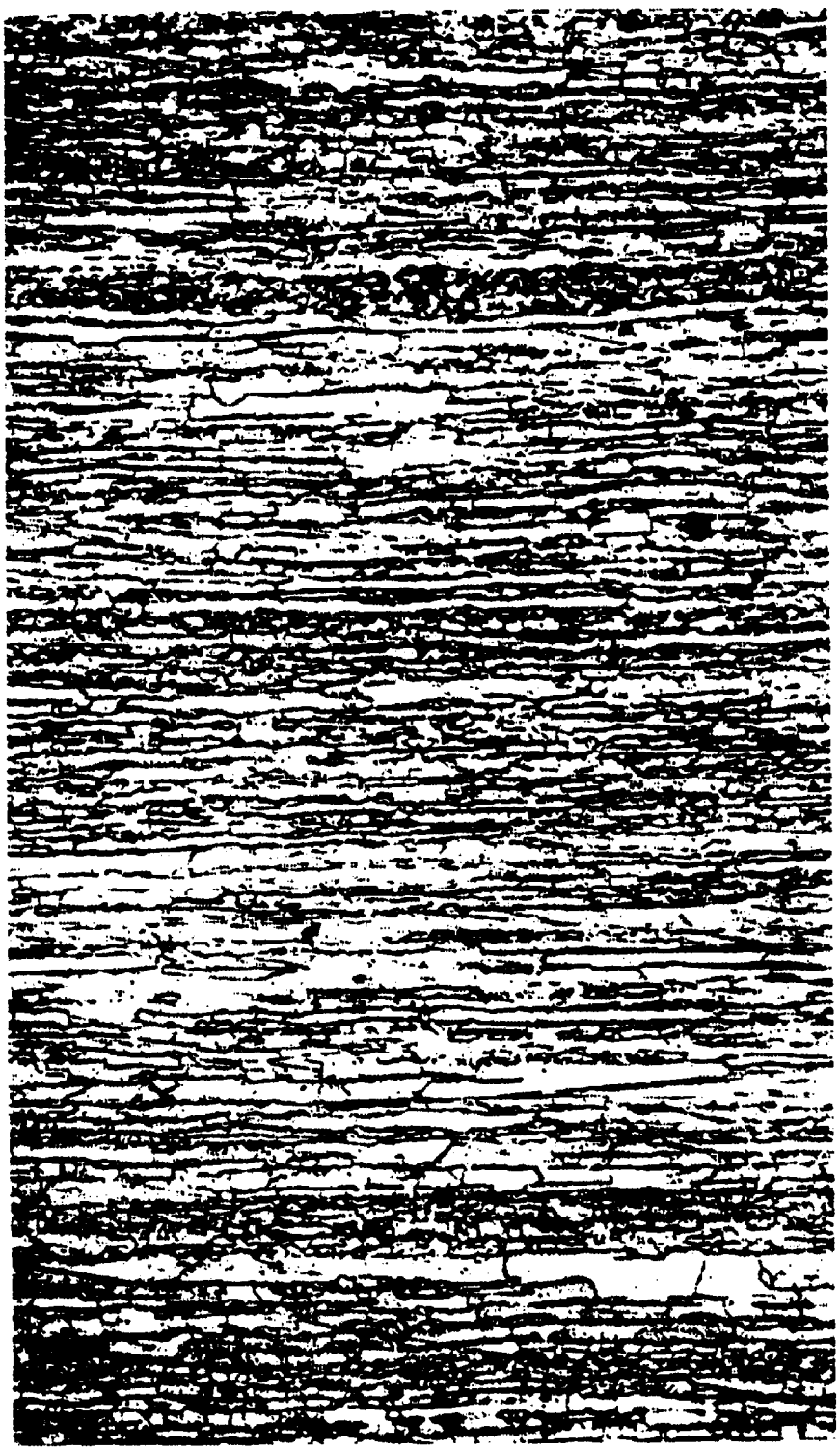
FIG. 14 shows a microstructure of the surface layer of the rolled half-tube at the concave side of the surface.

| Sample No. 1 | Ultimate strength $\sigma_b$(MPa) 2 | Impact toughness Y(MJ/m$^2$) 3 | Layers strength G(MJ/m$^2$) 4 | Thickness of diffusion layer (%) 5 | Surface corrosion Weight loss, $g_k$ (g/m$^2$h)10$^3$ 6 | Note |
|---|---|---|---|---|---|---|
| 1 | 520 | 0.8 | 0.6 | <1 | 9.5 | outside the invention |
| 2 | 550 | 1.1 | 1.0 | <5 | 4.5 | diffusion layer (FIG. 5) |
| 3 | 720 | 3.0 | 1.6 | 10 | 3.1 | diffusion layer (FIG. 9) |
| 4 | 690 | 2.2 | 1.3 | 10 | 3.0 | diffusion layer (FIG. 9) |
| 5 | 550 | 1.3 | 1.1 | 5 | 2.8 | diffusion layer (FIG. 5) |
| 6 | 960 | 3.2 | 1.7 | 60 | 2.6 | diffusion layer (FIG. 10) |
| 7 | 1100 | 2.6 | 1.6 | 90 | 2.5 | diffusion layer (FIG. 10) |
| 8 | 810 | 1.8 | 1.5 | 40 | 2.4 | diffusion layer (FIG. 10) |
| 9 | 540 | 0.9 | 0.7 | <5 | 14 | fractures, strat if |
| 10 | 700 | 2.8 | 1.2 | 10 | 2.0 | diffusion layer (FIG. 9) |
| 11 | 650 | 1.7 | 1.1 | <5 | 1.8 | diffusion layer (FIG. 5) |
| 12 | 570 | 2.1 | 1.4 | 10 | 1.7 | diffusion layer (FIG. 9) |
| 13 | 500 | 1.5 | 0.7 | <1 | 10 | outside the invention |
| 14 | 450 | 1.5 | 0.4 | <1 | 17.5 | prior art (stratif.) |
| 15 | 510 | 0.8 | 0.9 | <5 | 11.1 | closest prior art (cracks) |
| 16 | 470 | 2.3 | 0.5 | <1 | 13 | outside the invention |
| 17 | 690 | 2.4 | 1.3 | 10 | 4.2 | diffusion layer (FIG. 9) |
| 18 | 650 | 1.7 | 1.5 | 10 | 4.0 | diffusion layer (FIG. 9) |
| 19 | 780 | 2.0 | 1.3 | 10 | 1.3 | diffusion layer (FIG. 9) |
| 20 | 530 | 1.1 | 1.0 | <5 | 1.4 | diffusion layer (FIG. 5) |
| 21 | 1000 | 2.9 | 1.6 | 60 | 1.3 | diffusion layer (FIG. 10) |
| 22 | 1330 | 3.1 | 1.7 | 90 | 1.2 | diffusion layer (FIG. 10) |
| 23 | 490 | 0.8 | 0.7 | 5 | 7.6 | outside the invention |
| 24 | 810 | 2.7 | 1.4 | 25 | 1.4 | diffusion layer (FIG. 9) |
| 25 | 760 | 1.8 | 1.3 | 15 | 1.1 | diffusion layer (FIG. 9) |
| 26 | 640 | 1.3 | 1.1 | 5 | 1.5 | diffusion layer (FIG. 5) |
| 27 | 660 | 2.4 | 1.6 | 5 | 1.4 | diffusion layer (FIG. 9) |
| 28 | 520 | 1.4 | 0.7 | <1 | 8.1 | outside the invention |
| 29 | 460 | 1.6 | 0.5 | <1 | 9.4 | prior art (starif.) |
| 30 | 500 | 0.7 | 0.8 | <5 | 8.2 | closest prior art (cracks) |

TABLE 6

| | Corrugated bar | | | | Property change after corrosion tests for 42 days | | | | Note | |
|---|---|---|---|---|---|---|---|---|---|---|
| Sample mark | Diameter d(mm) | Relat. Coating thickness ($\psi$) | Corrugation height (depth) $H_0$(mm) | ($H_0/\psi d$) ($\leq 1$) | $\sigma_b$ (%) | Y (%) | G (%) | Surface | Bond by concrete mix | Conditions of the invention |
| $K_1$ | 14 | 0.1 | 2.0 | 1.4 | 85 | 92 | — | pitting | 175 | not met |
| $K_2$ | 14 | 0.1 | 1.4 | 1.0 | 100 | 100 | — | clean | 160 | |
| $K_3$ | 20 | 0.2 | 2.0 | 0.5 | 100 | 100 | — | clean | 205 | |
| $K_4$ | 20 | 0.1 | 1.4 | 0.7 | 100 | 100 | — | clean | 190 | |
| $K_5$ | 14 | 0.05 | 0.0 | 0.0 | 100 | 100 | — | clean | 100 | reference |

| | Strip with corrugated surface | | | | | | | | | |
|---|---|---|---|---|---|---|---|---|---|---|
| | thickness $h_0$(mm) | ($\psi$) | $h_1$(mm) | ($h_1/(\psi)h_0$) | | | | | | |
| $P_1$ | 4.0 | 0.1 | 0.5 | 12 | 90 | 93 | 92 | pitting | 190 | not met |
| $P_2$ | 5.0 | 0.1 | 0.5 | 1.0 | 98 | 98 | 97 | clean | 205 | |
| $P_3$ | 5.0 | 0.1 | 0.1 | 0.2 | 98 | 98 | 99 | clean | 150 | |
| $P_4$ | 5.0 | 0.1 | 0.05 | 0.1 | 97 | 98 | 98 | clean | 120 | not met |
| $P_5$ | 5.0 | 0.2 | 0.5 | 0.5 | 99 | 98 | 99 | clean | 195 | |
| $P_6$ | 4.0 | 0.05 | 0.5 | 2.5 | 92 | 93 | 90 | pitting | 185 | not met |
| $P_7$ | 3.0 | 0.05 | 0.15 | 1.0 | 97 | 97 | 97 | clean | 135 | |
| $P_8$ | 3.0 | 0.05 | 0.1 | 0.7 | 98 | 99 | 97 | clean | 125 | |
| $P_9$ | 3.0 | 0.05 | 0.2 | 1.3 | 94 | 96 | 92 | pitting | 140 | not met |
| $P_{10}$ | 3.0 | 0.05 | 0.0 | 0.0 | 99 | 100 | 99 | clean | 100 | reference |

| | Half-tube | | | | | Qualities changed after | | |
|---|---|---|---|---|---|---|---|---|
| | Thickness $H_0$(mm) | Diameter D(mm) | Curvature 1/D(mm$^{-1}$) | ($5h_0/D$) ($\leq 1$) | T° K. deform. | deformation $\sigma_b$/Y(%) | Corrosion tests Surface quality | |
| $T_1$ | 5 | 20 | 0.05 | 1.25 | 1160 | 105/75 | pitting | not met |
| $T_2$ | 5 | 25 | 0.04 | 1.0 | 1150 | 110/89 | clean | |
| $T_3$ | 5 | 25 | 0.04 | 1.0 | 300 | 130/80 | clean | |
| $T_4$ | 5 | 30 | 0.03 | 0.8 | 800 | 120/90 | clean | |

TABLE 7

| External diameter of sample d(%) | Internal diameter of coating | | Thickness of layers (%) | | | | | |
|---|---|---|---|---|---|---|---|---|
| | after treatment $d_{n1}$(%) | before treatment $d_0$(%) | Basic layer | | Coating | | Diffusion layer ($d_{n1} - d_{01}$) | |
| | | | before tr. $d_0$ | after tr. $d_{01}$ | before tr. ($d - d_0$)/2 | after tr. ($d - d_{n1}$)/2 | | |
| 100 | 90 | 90 | 90 | <90 | 5 | ~5 | ~1 | |
| 100 | 90 | 80 | 80 | 70 | 10 | 5 | 10 | |
| 100 | 90 | 70 | 70 | 40 | 15 | 5 | 20 | |
| 100 | 90 | 60 | 60 | 0 | 20 | 5 | 90 | |
| Prior art 100 | 80 | ~82 | 80 | ~78 | 10 | ~9 | up to 5 | |
| Reference 1 Coating | 100 | 100 | 0 | 0 | 100 | 100 | 0 | |
| Reference 2 Basic layer | 0 | 0 | 100 | 100 | 0 | 0 | 0 | |

| External diameter of sample d(%) | Volume of layers (%) | | | | | Rolled product properties | | |
|---|---|---|---|---|---|---|---|---|
| | Coating | | Diffusion layer $V_d$ | Basic layer | | $\sigma_b$/Y (MPa) | surface | Relative cost C(%) |
| | before tr. $V_n$ | after tr. $V_{n1}$ | | before tr. $V_0$ | after tr. $V_{01}$ | | | |
| 100 | 20 | ~20 | <4 | 80 | ~80 | 640/1.3 | clean | 28 |
| 100 | 35 | 20 | up to 50 | 65 | 30 | 780/2.0 | clean | 40 |
| 100 | 50 | 20 | up to 64 | 50 | 16 | 1000/2.9 | clean | 55 |

TABLE 7-continued

| 100 | 60 | 20 | up to 80 | 40 | up to 0 | 1300/3.1 | clean | 65 |
| Prior art 100 | 20 | <15 | <10 | 80 | | up to 75 | 500/0.7 | pitting | up to 30 |
| Reference 1 Coating | 100 | 100 | 0 | 0 | 0 | 650/1.9 | clean | 100 |
| Reference 2 Basic layer | 0 | 0 | 0 | 100 | 100 | 550/0.6 | rust | 10 |

Cost(%) = $(C_r V_n + C_{f2} V_o)/C_{r1}(V_n + V_o) = (100 V_n + 10 V_o) 10^4$

TABLE 8

| Sample mark | Sample size (mm) d//ho | Corrugation height (depth) (mm) | Volume factor of metal fillup η(%) | Specific contact surface with concrete λ(m²/m³) | Adhesion with concrete (%) | Note |
| --- | --- | --- | --- | --- | --- | --- |
| $K_5$ | 14// | 0.0 | 1.5 | 6.6 | 100 | reference |
| $K_2$ | 14// | 1.4 | 1.5 | 6.6 | 160 | |
| $P_{10}$ | //3 | 0.0 | 1.2 | 10 | 140 | |
| $P_8$ | //3 | 0.1 | 1.2 | 10 | 160 | |
| $P_7$ | //3 | 0.15 | 1.2 | 10 | 170 | |
| $P_5$ | //5 (1/D)//ho | 0.5 | 2.0 | 18 | 260 | |
| $T_3$ | 0.04//5 | 0.5 | 2.0 | 18 | 250 | |
| $T_4$ | 0.03//5 | 0.5 | 2.0 | 18 | 255 | |

λ(m²/m³) = S η N, where S is the surface of length unit of the reinforcing section (m²);
N is the number of reinforcing sections in volume unit of concrete.

Text Matter in Drawings

FIG. 1

1—Plain bar; 2—Corrugated bar; 3—Corrosion-resistant layer Fe—Cr—Ni; 4—Diffusion layer {(Fe,Ni)$_{1-x-y}$( )Si, Al)$_x$Cr$_y$}; 5—Solid solution Fe—Si—Al; 6—Maxim un deformation zone; 7—Cross-section of bimetallic rolled product; 8—Relative thickness of surface corrosion-resistant layer ψ=(d−d$_{n1}$)/d.

FIG. 2

1—Layers; 2—Corrosion-resistant; 3—Diffusion; 4—Basic; 5—Square billet; 6—Hot rolling; 7—Strip; 8—Press forming; 9—Half-tube.

FIG. 3

1—(MPa); 2—New phase {(Fe,Ni)$_{1-x-y}$(Si,Al)$_x$Cr$_y$}; 3—Solid solution Fe—Si—Al.

FIG. 4

Carbide phase.

FIG. 5 a—Cross-section of bimetallic rolled product; 1—Surface layer; 2—Diffusion layer; 3—Basic layer.

FIG. 9 a—Cross-section of bimetallic rolled product; 1—Surface layer; 2—Diffusion layer; 3—Basic layer.

FIG. 10 a—Cross-section of bimetallic rolled product; 1—Surface corrosion-resistant layer; 2—Diffusion layer.

What is claimed is:

1. Clad steel rolled section for reinforcing concrete, produced from a bimetallic ingot comprising a basic material, such as steel containing, in percent by weight: from 1.0 to 5.8 Si and from 0.1 to 5.0 Al with the proviso that 3.0≦(Si+Al)≦6.0, and a surface layer of ferritic or austenitic stainless steel containing a group of alloy elements including Cr and Ni, by hot rolling the ingot to an intermediate billet and a rolled section, and then subjecting the rolled section to heat treatment.

2. The clad steel rolled section as set forth in claim 1, wherein said basic and surface layers contain one or more components selected from the group including manganese, molybdenum, tungsten, vanadium, copper, titanium, niobium, zirconium, yttrium, rare-earth metals (REM), nitrogen and carbon, in percent by weight, in the basic layer: up to 3.0 nickel; up to 3.0 chromium; up to 3.0 manganese; up to 1.0 molybdenum; up to 0.5 tungsten; up to 0.7 vanadium; up to 0.5 copper; up to 0.3 titanium; up to 0.5 niobium; up to 0.5 zirconium; up to 0.2 yttrium; up to 0.2 REM; up to 0.5 nitrogen; up to 0.8 carbon; the balance being iron and impurities, and in the surface layer: up to 34 nickel; up to 25 chromium; up to 6.5 silicon; up to 4.0 aluminium; up to 6.0 manganese; up to 6.1 molybdenum; up to 4.0 tungsten; up to 0.5 vanadium; up to 5.0 copper; up to 1.2 titanium; up to 1.0 niobium; up to 1.0 zirconium; up to 0.5 yttrium; up to 0.5 REM; up to 0.8 nitrogen, up to 0.5 carbon, the balance being iron and impurities.

3. The clad steel rolled section as set forth in claim 1, wherein said surface layer having a relative thickness of up to 20% in the cross-section of the billet is made of a stainless steel with ferritic structure containing, in percent by weight: ≦3.0 Ni and from 10 to 25 Cr, the basic layer contains Si and Al in the ratio: Si/Al ≧(1+Ni/Cr), and a diffusion layer between said layers contains the main alloy components in the ratio:

{(Fe)$_{1-x-y}$(Si,Al)$_x$Cr$_y$}, where x+y≦18.

4. The clad steel rolled section as set forth in claim 1, wherein said surface layer having a relative thickness of up to 20% in the cross-section of the billet is made of a stainless steel with austenitic structure containing, in percent by weight: from 4 to 34 Ni and from 6 to 25 Cr, the basic layer contains Si and Al in the ratio Si/Al $\geq(2-Ni/Cr)$, and a diffusion layer between said layers contains the main alloy components in the ratio:

$$\{(Fe,Ni)_{1-x-y}(Si,Al)_x Cr_y\}, \text{ where } x+y \leq 18.$$

5. A method for producing a clad steel rolled section for reinforcing concrete, comprising the steps of: making a bimetallic bar with a surface layer of a stainless steel having austenitic structure; hot rolling in several passes by calibrated rolls, the final rolling being carried out by calibrated rolls with corrugated surface observing the relationship: $H_0/\psi \cdot \leq 1$, where $H_o$ is the maximum depth (height) of corrugations on the roll surface, d is the bar diameter, ψ is the relative thickness of the stainless layer.

6. A method for producing a clad steel rolled section for reinforcing concrete, comprising the steps of: making a bimetallic strip with a surface layer of a stainless steel; hot rolling in several passes by rolls with a plain body, the final rolling being carried out by calibrated rolls with corrugated surface observing the relationship: $0.2 \cdot (h_1/\psi h_0 \leq 1)$ where $h_1$ is the maximum depth (height) of corrugations on the roll surface, $h_o$ is the thickness of bimetallic strip, ψ is the relative thickness of the stainless layer.

7. A method for producing a clad steel rolled section, wherein the bimetallic strip is rolled or press formed at a temperature no more than 1150° K to a half-tube section with surface curvature 1/D and wall thickness $h_0$ within the relationship: $5 \cdot h_0/D \leq 1$.

8. The clad steel rolled section as set forth in claim 2, wherein said surface layer having a relative thickness of up to 20% in the cross-section of the billet is made of a stainless steel with ferritic structure containing, in percent by weight: $\leq 3.0$ Ni and from 10 to 25 Cr, the basic layer contains Si and Al in the ratio: Si/Al $\geq(1+Ni/Cr)$, and a diffusion layer between said layers contains the main alloy components in the ratio:

$$\{(Fe)_{1-x-y}(Si,Al)_x Cr_y\}, \text{ where } x+y\ 18.$$

9. The clad steel rolled section as set forth in claim 2, wherein said surface layer having a relative thickness of up to 20% in the cross-section of the billet is made of a stainless steel with austenitic structure containing, in percent by weight: from 4 to 34 Ni and from 6 to 25 Cr, the basic layer contains Si and Al in the ratio Si/Al $\geq(2-Ni/Cr)$, and a diffusion layer between said layers contains the main alloy components in the ratio:

$$\{(Fe,Ni)_{1-x-y}(Si,Al)_x Cr_y\}, \text{ where } x+y \leq 18.$$

* * * * *